US011610000B2

(12) United States Patent
Bishop, III et al.

(10) Patent No.: US 11,610,000 B2
(45) Date of Patent: Mar. 21, 2023

(54) SYSTEM AND METHOD FOR IDENTIFYING UNPERMITTED DATA IN SOURCE CODE

(71) Applicant: Bank of America Corporation, Charlotte, NC (US)

(72) Inventors: Jack Lawson Bishop, III, Evanston, IL (US); Jason Conrad Starin, Huntersville, NC (US); Kevin Dean Kirkwood, Parker, CO (US)

(73) Assignee: Bank of America Corporation, Charlotte, NC (US)

( * ) Notice: Subject to any disclaimer, the term of this patent is extended or adjusted under 35 U.S.C. 154(b) by 371 days.

(21) Appl. No.: 17/065,324

(22) Filed: Oct. 7, 2020

(65) Prior Publication Data
US 2022/0108022 A1 Apr. 7, 2022

(51) Int. Cl.
*G06F 21/57* (2013.01)
*G06F 21/56* (2013.01)
*G06F 16/245* (2019.01)
*G06F 8/75* (2018.01)

(52) U.S. Cl.
CPC ............. *G06F 21/577* (2013.01); *G06F 8/75* (2013.01); *G06F 16/245* (2019.01); *G06F 21/563* (2013.01); *G06F 2221/033* (2013.01)

(58) Field of Classification Search
None
See application file for complete search history.

(56) References Cited

U.S. PATENT DOCUMENTS

| | | | |
|---|---|---|---|
| 7,171,693 B2 | 1/2007 | Tucker et al. | |
| 7,437,718 B2 | 10/2008 | Fournet | |
| 7,475,072 B1 | 1/2009 | Ershow | |
| 7,664,845 B2 | 2/2010 | Kurtz et al. | |
| 7,849,509 B2 | 12/2010 | Venkatapathy et al. | |
| 8,024,807 B2 | 9/2011 | Hall et al. | |
| 8,347,392 B2 | 1/2013 | Chess et al. | |
| 8,458,798 B2 | 6/2013 | Williams et al. | |
| 8,479,188 B2 | 7/2013 | Singh et al. | |
| 8,555,269 B2 | 10/2013 | Huang et al. | |
| 8,572,750 B2 | 10/2013 | Patel et al. | |

(Continued)

OTHER PUBLICATIONS

Jack Lawson Bishop, III, et al., "System and Method for Identifying Insider Threats in Source Code," U.S. Appl. No. 17/065,426, filed Oct. 7, 2020, 76 pages.

*Primary Examiner* — Michael Pyzocha

(57) ABSTRACT

A system configured for identifying unpermitted data in source code receives a search query comprising particular keywords related to the unpermitted data. The system labels the source code with vulnerability factors and categories of those vulnerability factors, where the vulnerability factors indicate a security vulnerability and the categories provide information about the security vulnerability of the source code. The system performs a static analysis on the source code to identify instances of the particular keyword in a data flow and control flow of the source code. The system performs a vulnerability analysis on the source code to determine a vulnerability level of the source code, in which factor weights and category weights for each code portion of the source code are determined. The system calculates a weighted sum of the factor weights and category weights for each code portion, thereby detecting instances of unpermitted data in source code.

20 Claims, 5 Drawing Sheets

(56) References Cited

U.S. PATENT DOCUMENTS

| | | | |
|---|---|---|---|
| 8,576,679 B2 | 11/2013 | Nonaka et al. | |
| 8,688,676 B2 | 4/2014 | Rush et al. | |
| 8,701,198 B2 | 4/2014 | Greene et al. | |
| 8,726,394 B2 | 5/2014 | Maor et al. | |
| 8,732,839 B2 | 5/2014 | Hohl | |
| 8,739,280 B2 | 5/2014 | Chess et al. | |
| 8,745,703 B2 | 6/2014 | Lambert et al. | |
| 8,752,182 B2 | 6/2014 | Amit et al. | |
| 8,800,042 B2 | 8/2014 | Sima et al. | |
| 8,806,618 B2 | 8/2014 | Livshits et al. | |
| 8,819,637 B2 | 8/2014 | Abadi et al. | |
| 8,893,282 B2 | 11/2014 | Pennington et al. | |
| 8,910,291 B2 | 12/2014 | Haviv et al. | |
| 8,935,794 B2 | 1/2015 | Brake et al. | |
| 8,978,160 B2 | 3/2015 | Alrabady et al. | |
| 9,009,655 B2 | 4/2015 | Shinjo et al. | |
| 9,118,713 B2 | 8/2015 | Bisht et al. | |
| 9,158,922 B2 | 10/2015 | Liu | |
| 9,264,443 B2 | 2/2016 | Weisman | |
| 9,276,951 B2 | 3/2016 | Choi et al. | |
| 9,378,242 B1 | 6/2016 | Fontenot et al. | |
| 9,400,889 B2 | 7/2016 | Chess et al. | |
| 9,454,659 B1 | 9/2016 | Daymont | |
| 9,507,940 B2 | 11/2016 | Greene et al. | |
| 9,659,065 B1 | 5/2017 | Reis de Sousa | |
| 9,667,643 B2 | 5/2017 | Cotton et al. | |
| 9,811,556 B2 | 11/2017 | Fontenot et al. | |
| 9,864,860 B2 | 1/2018 | Burrell et al. | |
| 9,934,270 B2 | 4/2018 | Friedman et al. | |
| 10,257,220 B2 | 4/2019 | Gorodissky et al. | |
| 10,395,040 B2 | 8/2019 | Carey et al. | |
| 10,540,350 B2 | 1/2020 | Fontenot et al. | |
| 2005/0283834 A1* | 12/2005 | Hall | G06F 21/577 713/188 |
| 2006/0156008 A1 | 7/2006 | Frank | |
| 2011/0302566 A1* | 12/2011 | Abadi | G06F 21/577 717/168 |
| 2014/0165204 A1 | 6/2014 | Williams et al. | |
| 2015/0186649 A1* | 7/2015 | Humble | G06F 21/564 726/23 |
| 2015/0332055 A1 | 11/2015 | Siman | |
| 2015/0363294 A1 | 12/2015 | Carback, III et al. | |
| 2016/0212153 A1* | 7/2016 | Livshits | G06F 21/56 |
| 2017/0078317 A1 | 3/2017 | Gertner et al. | |
| 2017/0169223 A1* | 6/2017 | Lin | G06F 21/563 |
| 2019/0007444 A1 | 1/2019 | Shekyan et al. | |
| 2019/0132334 A1* | 5/2019 | Johns | H04L 63/145 |
| 2019/0197260 A1* | 6/2019 | Wang | G06F 21/606 |
| 2019/0324727 A1* | 10/2019 | Carranza | G06F 11/3604 |
| 2019/0384913 A1* | 12/2019 | Usui | G06N 20/00 |
| 2020/0074080 A1* | 3/2020 | Srinivasagopalan | G06F 21/563 |
| 2020/0117446 A1 | 4/2020 | Smith et al. | |
| 2020/0134195 A1* | 4/2020 | Youngberg | G06F 21/563 |
| 2020/0342114 A1* | 10/2020 | Mohan | H04L 63/1433 |
| 2020/0372154 A1* | 11/2020 | Bacher | H04L 41/147 |
| 2021/0141899 A1* | 5/2021 | Candido De Lima Junior | G06F 12/1433 |
| 2021/0248234 A1* | 8/2021 | Srinivasagopalan | G06F 21/563 |
| 2021/0264029 A1* | 8/2021 | Yoo | G06F 21/563 |
| 2022/0004642 A1* | 1/2022 | Pujar | G06K 9/6259 |
| 2022/0244953 A1* | 8/2022 | Ji | G06F 8/751 |

\* cited by examiner

Example code portion 164

```
Line

1       Function foo ( arg1, arg2)
2       {
3           DriverManager.getConnection (..."database01"...)
4
5
6           if (arg1 PASS) {
7               do this
8           }
9           else if (arg2 PASS) {          ← Malicious code 330a
10              createStatement
11              executeQuery
12          }
13          else {
14              throw exception (because arg1, arg2 negative)
15          }
16      }
```

*FIG. 4*

SYSTEM AND METHOD FOR IDENTIFYING UNPERMITTED DATA IN SOURCE CODE

TECHNICAL FIELD

The present disclosure relates generally to information security and vulnerability assessment in source code, and more specifically to a system and method for identifying unpermitted data in source code.

BACKGROUND

While software systems continue to grow in size and complexity, business demands continue to require shorter development cycles. This trend has led software developers to compromise on functionality, quality, and time to market of software products in order to meet those business demands. As such, software products often suffer from insufficient testing, poor quality, and therefore security vulnerabilities. Related to the shorter development cycles is reduced oversight in direct conflict with the increasing importance placed in software and the commensurate value it provides. This latter considerations results in an increased risk of developers embedding risky or malicious content into software work products. Tracking sources or causes of those security vulnerabilities is time-consuming and requires the services of expert software developers and security professionals.

SUMMARY

Current security vulnerability assessment technologies are not configured to provide a comprehensive security vulnerability assessment for software products. As discussed above, software products typically suffer from insufficient testing and thus contain security vulnerabilities. In some cases, a security vulnerability in the source code may be related to unpermitted data. For example, the unpermitted data may be due to less than perfect coding practices, such as using hard-coded credentials, weak/inadequate encryption methods, and weak/inadequate validation methods allowing for unauthorized access. In some cases, a major security vulnerability in source code may occur due to two or more minor security vulnerabilities that were injected into the source code at different times in the past.

In some cases, a security vulnerability in the source code may be related to insider threats. For example, an insider threat may be related to a particular individual who has intentionally contributed or caused one or more security vulnerabilities in an attempt at circumventing various security controls. In another example, an insider threat may be related to a scenario where an insider enlists or deceives others to check-in his/her malicious code into production. In another example, an insider threat may be related to an obfuscated malicious code, such that it is out of mainline or mainstream of the operation of the source code, and is only triggered or harvested when specific conditions are met, such as a particular input is received by the source code, the source code is executed at a particular location, or a particular time is reached, etc.

In such cases, by identifying different correlations related to an insider threat, potential insider threat candidates can be identified. The potential insider threat candidates may go through further analysis to determine whether they are indeed insider threats, such as a composite analysis. The composite analysis determines points of correlations between static analysis techniques including data flow analysis, and control flow analysis, whereby grouping or "gluing" results from these analyses, instances that are likely to include intentional insider threats are determined. Also, by determining and comparing a coding style used in the insider threat and coding styles of suspects of committing the insider threat, the author of the insider threat can be identified.

With respect to identifying unpermitted data, this disclosure contemplates a system and a method for identifying security vulnerabilities related to unpermitted data for different use cases which follows from identifying a known pattern, such as identifying hard-coded credentials, improper/inadequate coding practices, etc. The system and method for identifying unpermitted data are described in the corresponding descriptions of FIGS. 1 and 2.

With respect to identifying insider threats, this disclosure contemplates a system and a method for identifying security vulnerabilities related to insider threats for different use cases which follows from identifying an anti-pattern, such as identifying scenarios where an insider has used another account to check-in a malicious code (i.e., code smuggling), a malicious code is purposefully obfuscated or layered such that it is not executed in the mainline or mainstream operation of the source code, external data with respect to the source code is involved, and know or expected insider threat targets are found, e.g., databases, server, etc. The system and method for identifying insider threats are described in the corresponding descriptions of FIGS. 3-5.

Certain embodiments of this disclosure provide unique solutions to technical problems of the current security vulnerability assessment technologies, including those problems described above. For example, with respect to identifying unpermitted data, the disclosed system provides several technical advantages, which include: 1) identifying instances of a particular security vulnerability in data flow and/or control flow of a plurality of source code (e.g., by implementing a static analysis on the plurality of source code using semantic, data flow, and control flow analyses in combination with machine learning clustering techniques); 2) identifying instances of a particular operation being performed on the particular security vulnerability, where the particular operation is a cause of the exposure of the particular security vulnerability; 3) labeling the plurality of source code (and its code portions) with one or more vulnerability factors and categories of those vulnerability factors; 4) determining vulnerability factor weights and category weights for each source code (and code portion) based at least in part upon their corresponding potential severity of consequences or risks of exposure (i.e., their vulnerability levels) using linear regression and machine learning techniques; 5) ranking those source code (or code portions) that contain instances of the particular security vulnerability based at least in part upon their corresponding vulnerability levels; and 6) customizing result display of those source code (or code portions) containing instances of the particular security vulnerability for each employee of the organization, such that each employee who would be authorized to view certain instances of the particular security vulnerability belonging to him/her, and other instances particular security vulnerability (belonging to others) are masked for that employee.

For example, with respect to identifying insider threats, the disclosed system provides several technical advantages, which include: 1) associating code portions to their corresponding authors based on their coding styles; 2) automating the analysis of identifying instances of insider threats by defining a set of rules that specify known or expected obfuscation and concealment methods; 3) identifying potential instances of insider threat candidates by determining correlations between results outputted from the semantic analysis, data flow analysis, and control flow analysis, where these analyses are configured to identify instances likely to be related to insider threats using machine learning clustering techniques; 4) classifying different sets of potential insider threat candidates into their corresponding clusters, where each cluster is defined as a distinct scenario of committing or causing an insider threat and; 5) increasing the accuracy of predictions in identifying insider threats based on the accuracy of identified potential insider threat candidates being insider threats by tuning a set of rules used to configure the semantic analysis, data flow analysis, control flow analysis and machine learning techniques.

As such, this disclosure may improve the current security vulnerability assessment technologies by providing a comprehensive analysis of security vulnerabilities for each use case discussed above. Accordingly, the disclosed system provides a practical application of improving the operations of software systems/products/applications by identifying instances of security vulnerabilities in their corresponding source code. This, in turn, leads to an additional practical application of increasing the security of confidential data stored in servers and databases associated with the source code of those software systems. Thus, by improving the security of the confidential data stored in those servers and databases, the operations of those servers and databases may be improved.

With respect to identifying unpermitted data in source code described in FIGS. 1-2, in one embodiment, a system for identifying unpermitted data in source code includes a memory operable to store source code comprising a plurality of code portions. The system also includes a processor communicatively coupled to the memory. The processor is configured to label each code portion of the source code with one or more vulnerability factors that indicate a security vulnerability associated with that code portion. The processor is configured to label each code portion with a category of each vulnerability factor from the one or more vulnerability factors. The category of each vulnerability factor provides information about the security vulnerability associated with that code portion with respect to that vulnerability factor.

The processor receives a search query from a user to detect unpermitted data in the source code, where the unpermitted data comprises at least one of an unsecured data and a defective code portion. The search query comprises a particular keyword which includes the unpermitted data and at least one of the vulnerability factors. The processor performs a static analysis on each code portion, where the static analysis comprises identifying one or more instances of the particular keyword in a code portion. In response to identifying one or more instances of the particular keyword in a code portion, the processor performs a vulnerability analysis on the code portion to determine a vulnerability level for the code portion.

The processor determines a factor weight for each vulnerability factor based at least in part upon a contribution that each vulnerability factor has on the vulnerability level for the code portion. The processor determines a category weight for the category of each vulnerability factor based at least in part upon a contribution that each category has on the vulnerability level for a corresponding code portion. The vulnerability level associated with the code portion corresponds to a potential severity of exposure of the code portion if the code portion comprised the unpermitted data. The processor determines a score value of the code portion by calculating a weighted sum of one or more factor weights and their corresponding one or more category weights. The processor identifies code portions having score values above a threshold value as potential unpermitted data candidates. For each potential unpermitted data candidate, the processor determines whether the potential unpermitted data candidate is among the unpermitted data by comparing the potential unpermitted data candidate category and factor weights against a set of known unpermitted data category & factor weights (e.g., threshold). In response to a determination that the potential unpermitted data candidate is not among the set of known unpermitted data, the processor adjusts the one or more factor weights and the one or more category weights in the vulnerability analysis.

With respect to identifying insider threats in source code described in FIGS. 3-5, in one embodiment, a system for identifying insider threats in source code includes a memory operable to store source code comprising a plurality of code portions. The system also includes a processor communicatively coupled to the memory. The processor is configured to label each code portion of the source code with its corresponding author and timestamps when it was accessed.

The processor conducts an automated analysis on the plurality of code portions. The automated analysis is designed based at least in part upon one or more rules to identify instances of insider threats, where the one or more rules specify one or more coding patterns that are known or expected to be used to obfuscate an instance of insider threat in a code portion.

The processor performs a static analysis on a first set of code portions outputted from the automated analysis, where the first set of code portions is a subset of the plurality of code portions, the first set of code portions correspond to the one or more coding patterns. The static analysis comprises one or more of semantic analysis, a data flow analysis, and a control flow analysis. The semantic analysis is configured to identify particular keywords associated with at least one of an insider threat targets and a method of conducting an insider threat. The data flow analysis is configured to identify data transfer paths where external data with respect to each code portion is used. The control flow analysis is configured to identify execution paths where one or more coding layers are used to obfuscate a content. The processor performs a composite analysis on the first set of code portions, where the composite analysis is configured to identify points of correlations between results individually outputted from the semantic analysis, the data flow analysis, and the control flow analysis. The composite analysis assigns a weight value to each code portion of the first set of code portions, corresponding to a probability of that code portion comprising an insider threat.

The processor identifies code portions from the first set of code portions having weight values above a threshold value as potential insider threat candidates, where the threshold value is defined based on categories and factors of code portions comprising insider threats. Where traditional static analysis searches for the existence of patterns, this embodiment searches for the absence of traditional patterns and the existence of antipatterns. For each of the potential insider threat candidates, the processor determines whether the insider threat candidate is among the insider threats by comparing the potential insider threat candidate with a set of known insider threats. In response to a determination that the potential insider threat candidate is not among the set of known insider threats, the processor adjusts a weight value of the potential insider threat candidate.

Certain embodiments of this disclosure may include some, all, or none of these advantages. These advantages, and other features, will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 4 illustrates an example code portion including a malicious code related to an insider threat.

DETAILED DESCRIPTION

Figure 1:
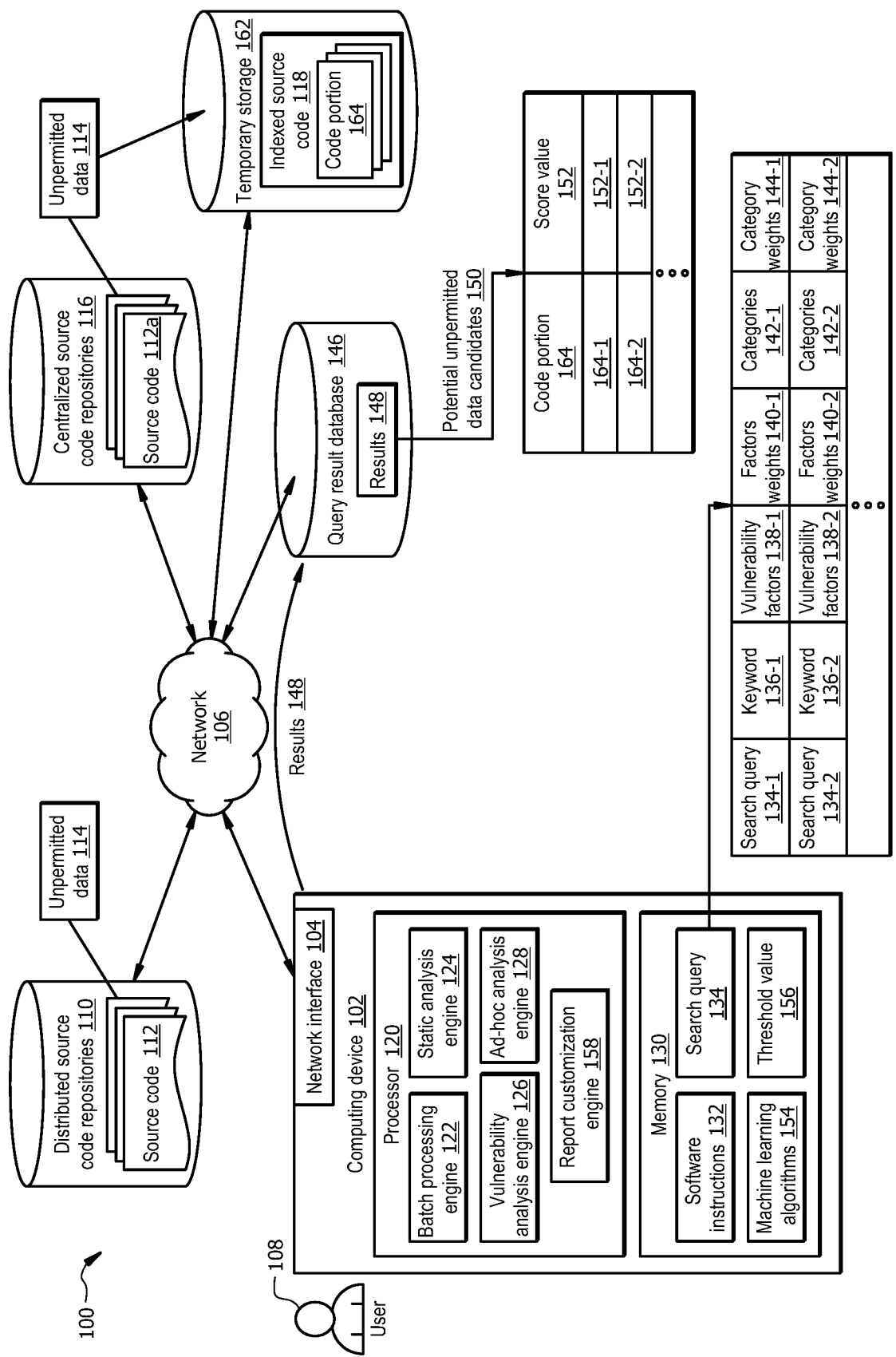
FIG. 1 illustrates one embodiment of a system configured to identify unpermitted data in source code.

This disclosure provides various systems and devices for improving vulnerability assessment technologies and identifying security vulnerabilities intentionally or inadvertently injected in source code. In one embodiment, a system 100 and a method 200 for identifying unpermitted data 114 in source code 112 are described herein with respect to FIGS. 1 and 2. In one embodiment, a system 300 and a method 500 for identifying insider threats 302 in source code 112 are described herein with respect to FIGS. 3-5.

Example System for Identifying Unpermitted Data in Source Code

FIG. 1 illustrates one embodiment of a system 100 configured to identify unpermitted data 114 in source code 112. In one embodiment, the system 100 comprises a computing device 102 that includes a processor 120 in signal communication with a memory 130 and a network interface 104. Memory 130 includes software instructions 132 that when executed by the processor 120, cause computing device 102 to perform one or more functions described herein. The computing device 102 is configured to communicate with distributed source code repositories 110, centralized source code repositories 116, and query result database 146 via the network interface 104 through network 106. The distributed source code repositories 110, centralized source code repositories 116, query result database 146, and temporary storage 162 provide information that may be used by software instructions 132 and/or processors 120. In one embodiment, the processor 120 executes software instructions 132 to implement a batch processing engine 122, static analysis engine 124, vulnerability analysis engine 126, ad-hoc analysis engine 128, and report customization engine 158. In other embodiments, system 100 may not have all of the components listed and/or may have other elements instead of, or in addition to, those listed above.

In general, system 100 improves security vulnerability assessment technologies by detecting instances of unpermitted data 114 in source code 112. In particular, system 100 identifies instances of potential unpermitted data candidates 150 and escalates more severe instances based on their score values 152 which are calculated based on the severity of exposure of a code portion 164 (or indexed source code 118) if that code portion 164 (or indexed source code 118) contained unpermitted data 114. Indexed source code 118 and code portion 164 are used interchangeably to refer to the results of a code indexing process of source code 112a. The system 100 automatically adjusts or tunes the factor weights 140 and/or category weights 144 of one or more indexed source code 118 based on results from supervised and/or unsupervised machine learning algorithms 154.

Computing device 102 is generally any computing device configured to communicate with other devices, such as other computing devices 102, servers, databases (e.g., distributed source code repositories, centralized source code repositories), etc. via network interface 104 through the network 106. The computing device 102 is configured to perform specific functions described herein and interact with users 108, e.g., via its user interfaces. Examples of computing device 102 include, but are not limited to: desktop computers, mobile phones, tablet computers, laptop computers, servers, etc. In one example, computing device 102 may be a server associated with an organization that provides services and/or products to its customer or clients. The computing device 102 may serve to host applications (e.g., software/web/mobile applications) to carry out the steps for identifying unpermitted data 114 in source code 112. For example, the computing device 102 may host applications in which the batch processing engine 122, static analysis engine 124, vulnerability analysis engine 126, ad-hoc analysis engine 128, and report customization engine 158 are implemented.

Network interface 104 is configured to enable wired and/or wireless communications (e.g., via network 106). The network interface 104 is configured to communicate data between the computing device 102 and other devices (e.g., computing devices 102), databases (e.g., distributed source code repositories, centralized source code repositories), systems, or domain(s). For example, the network interface 104 may comprise a WIFI interface, a local area network (LAN) interface, a wide area network (WAN) interface, a modem, a switch, or a router. The processor 120 is configured to send and receive data using the network interface 104. The network interface 104 may be configured to use any suitable type of communication protocol as would be appreciated by one of ordinary skill in the art.

Network 106 may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 106 may be configured to support any suitable type of communication protocol as would be appreciated by one of ordinary skill in the art.

Distributed source code repositories 110 may be implemented using any memory storage including but not limited to cloud-based memory storage comprising data centers, Network-Attached Storage (NAS), etc. In one embodiment, the distributed source code repositories 110 may store a plurality of source code 112 that includes binary code, binary files, scripts, configuration files, spreadsheets, documents, etc. The plurality of source code 112 contains information associated with the organization, such as information related to clients of the organization (e.g., confidential data of clients), source codes for software/web/mobile applications of the organizations, and/or the like. In some cases, any of the plurality of source code 112 may contain unpermitted data 114. The unpermitted data 114 are generally sources of vulnerabilities in the plurality of source code 112. In a first example, the unpermitted data 114 may include using hard-coded credentials (e.g., username or password) of an employee, server, and/or database of the organization in the source code 112. In a second example, unpermitted data 114 may include not using an appropriate security mechanism or using a weak security mechanism in encrypting credentials in the source code 112, such as Base 54 hashing, etc. In a third example, unpermitted data 114 may include using defective/improper/less than perfect programming methods, such as calling out a private variable in a public class, improper/lack of exception handling, improper log handling, improper data storing in an unsecured database, etc. In a fourth example, unpermitted data 114 may include using a weak authentication method, such as a single-factor authentication method, for authenticating users to access a particular server, database, and/or software/web/mobile application.

In some cases, employees of the organization may intentionally or inadvertently include the unpermitted data 114 in the source code 112. In some cases, unpermitted data 114 (or sources of vulnerabilities) are programming language-specific. For example, SQL, JavaScript, and PHP programming languages are vulnerable to code injections or SQL injections, where the third party is able to take advantage of flaws in data processing that cause user inputs to be interpreted as system commands or include a malicious script in uploaded files. In some cases, the unpermitted data 114 included in a particular source code 112 may traverse to other source code 112/files/databases or be stored in other files/databases. For example, in some programming languages, database connection configurations may be stored in a separate configuration file. As such, if the unpermitted data 114 (e.g., hard-coded credentials for connecting to a database) was included in a particular source code 112, the unpermitted data 114 may also traverse to a configuration file associated with the particular source code 112.

The employees of the organization may use different version control tools for managing different versions of the source code 112 that they are working on. As such, the plurality of source code 112 may be stored in different formats such as Team Foundation Server (TFS), ClearCase, Subversion, Bitbucket, Git, etc. In order to properly digest the plurality of source code 112 to identify instances or locations of the unpermitted data 114, the plurality of source code 112 is digested and indexed with their vulnerability factors 138 and categories 142 associated with those vulnerability factors 138 by the batch processing engine 122.

Details of the operation of the batch processing engine 122 are described hereinafter with respect to FIG. 1. Centralized source code repositories 116 may be implemented using any memory storage including but not limited to cloud-based memory storage comprising data centers, Network-Attached Storage (NAS), etc. In one embodiment, the centralized source code repositories 116 may be created through regular batch updates from distributed source code repositories 110, where source code 112 in the distributed source code repositories 110 may episodically or asynchronously be centralized into the centralized source code repositories 116 in the form of source code 112a. The centralized source code repositories 116 thus store a plurality of source code in a defined format 112a (for example, along with metadata about a time of the creation of the code and author of the code) that may, for example, subsequently be indexed into indexed source code 118 (i.e., the indexed plurality of source code 112) by the batch processing engine 122 through a code indexing procedure. The indexed source code 118 may be stored such as in, but not limited to, a temporary storage 162. The temporary storage 162 may be implemented using any memory storage including, but not limited, to cloud-based memory storage comprising data centers, Network-Attached Storage (NAS), etc.

Processor 120 comprises one or more processors operably coupled to network interface 104, and memory 130. The processor 120 is any electronic circuitry including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 120 may be a programmable logic device, a microcontroller, a microprocessor, or any suitable combination of the preceding. The one or more processors are configured to process data and may be implemented in hardware or software. For example, the processor 120 may be 8-bit, 16-bit, 32-bit, 64-bit, or of any other suitable architecture. The processor 120 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions (e.g., software instructions 132) to implement the batch processing engine 122, static analysis engine 124, vulnerability analysis engine 126, ad-hoc analysis engine 128, and report customization engine 158. In another example, the one or more processors are configured to execute instructions (e.g., software instructions 132) to implement automated analysis engine 312, and composite analysis engine 314, and clustering module 316 (see FIG. 3). In this way, processor 120 may be a special-purpose computer designed to implement the functions disclosed herein. In an embodiment, the processor 120 is implemented using logic units, FPGAs, ASICs, DSPs, or any other suitable hardware. The processor 120 is configured to operate as described in FIGS. 1-4. For example, the processor 120 may be configured to perform the steps of method 200 as described in FIG. 2 and method 500 as described in FIG. 5.

Memory 130 may be volatile or non-volatile and may comprise a read-only memory (ROM), random-access memory (RAM), ternary content-addressable memory (TCAM), dynamic random-access memory (DRAM), and static random-access memory (SRAM). Memory 130 may be implemented using one or more disks, tape drives, solid-state drives, and/or the like. Memory 130 is operable to store the software instructions 132, search query 134, machine learning algorithms 154, threshold value 156 and/or any other data or instructions. Memory 130 is also operable to store search query 322, machine learning algorithms 338, threshold value 342, rules 334, semantic analysis rules 306, data flow analysis rules 308, control flow analysis rules 310 and/or any other data or instructions (see FIG. 3). The software instructions 132, search queries 134, 322, machine learning algorithms 154, 338, threshold values 156, 342, rules 334, semantic analysis rules 306, data flow analysis rules 308, and control flow analysis rules 310 may comprise any suitable set of instructions, logic, rules, or code operable to execute the processor 120.

Batch Processing Engine

The batch processing engine 122 may be implemented by the processor 120 executing software instructions 132, and is configured to digest the plurality of source code in a defined format 112a in the centralized source code repositories 116. The batch processing engine 122 is configured to obtain source code 112a and organize, synthesize, and analyze it in order, for example, to make them query-searchable based on their vulnerability factors 138 and categories 142. In this process, the batch processing engine 122 may perform parsing and additional types of code analysis to add metadata to each source code 112a or portions of each source code 112a, such as their timestamps when they are accessed, file types, etc.

The batch processing engine 122 is also configured to allow for the determination of vulnerability factors 138 and categories 143 of those vulnerability factors 138 related to the source code 112a based on a preprocessing step of indexing/labeling the source code 112a fetched from the distributed source code repositories 110. The batch processing engine 122 persists the results of the code indexing of the source code 112a in a temporary database 162. In other words, the batch processing engine 122 outputs the indexed source code 118 (which is the indexed or labeled source code 112a) in the temporary database 162.

In one embodiment, the batch processing engine 122 (during the code indexing) treats the source code 112a as documents and extracts meaningful information from them, such as their names, projects, file sizes, file types, employees who worked on them, timestamps of those employees when they worked on them, security mechanisms, etc. For example, the batch processing engine 122 may use Big Data processing tools, such as Hadoop, Mongo DB, and/or the like for digesting and indexing the source code 112a. In one embodiment, the code indexing is based on different use cases or search queries 134 to find different unpermitted data 114, where the vulnerability factors 138 and categories 143 of those vulnerability factors 138 are determined based on criteria defined in each search query 134.

In one embodiment, the batch processing engine 122 indexes the source code 112a based on, for example, their vulnerability factors 138 and categories 142 of those vulnerability factors 138. The batch processing engine 122 may episodically perform the digesting and indexing of the source code 112a and store the results in the temporary storage 162. Particular examples of vulnerability factors 138-1 and categories 142-1 of those vulnerability factors 138-1 associated with the plurality of source code 118 are illustrated in TABLE 1.

TABLE 1

Particular examples of vulnerability factors 138-1 and categories 142-1 of those vulnerability factors 138-1 are associated with source code 118.

| Vulnerability factors 138-1 | Categories 142-1 |
| --- | --- |
| File type | Compiled source code |
| | Uncompiled source code |
| | Configuration file |
| Security mechanism | None |
| | Weak |
| | Moderate |
| | Strong |
| | Vault |
| Credential type | UserID |
| | Service account |
| | Database account |
| | Group account |
| Affinity profile | Individual |
| | Team |
| | Software/web/mobile application |
| Timestamp | Credential interval periods |

In the examples illustrated in TABLE 1, the vulnerability factors 138-1 associated with each source code 118-1 include file type, security mechanism, credentials type, affinity profile, and timestamp. Each vulnerability factor 138-1 associated with indexed source code 118 includes different sets of categories 142-1. The file type vulnerability factor associated with indexed source code 118 indicates a type of file in which that source code 112 is stored. The file type vulnerability factor associated with the indexed source code 118 includes compiled, uncompiled, and configuration files categories. The security mechanism vulnerability factor associated with indexed source code 118 indicates a type and strength of the security mechanism used in the corresponding source code 112. The security mechanism vulnerability factor associated with indexed source code 118 includes none, weak cryptography (e.g., Base 64), moderate cryptography (e.g., SHA1, MD5, other simple 2-way hashes), strong cryptography, and vault methods categories. The credential type vulnerability factor associated with indexed source code 118 indicates access privileges of that credential type, which is found in corresponding source code 112. The credential type vulnerability factor includes userID, service account, database account, and group account. The affinity profile vulnerability factor includes individual, team, and software/web/mobile application categories. The affinity profile vulnerability factor indicates an affinity of deceit associated with the employees, teams of employees, and software/web/mobile applications of the organization. The timestamp vulnerability factor indicates timestamps when each employee of the organization has accessed each source code 112. In other examples, the batch processing engine 122 may determine other vulnerability factors 138 and/or categories 142.

Once the indexed source code 118 is stored in temporary storage 162, they are query-searchable based on their vulnerability factors 138 and/or categories 142 of those vulnerability factors 138. In other words, the indexed source code 118 is labeled with their corresponding vulnerability factors 138 and categories 142 of those vulnerability factors 138. Each indexed source code 118 may include a plurality of code portions 164. Each code portion 164 of indexed source code 118 may be indexed or labeled with its corresponding vulnerability factors 138 and categories 142 of those vulnerability factors 138. As such, the user 108 can run or execute search queries 134 to detect or identify instances or locations of unpermitted data 114 throughout the indexed source code 118 or code portions 164 using those vulnerability factors 138 and categories 142. Potential unpermitted data candidates 150 from the results 148 of a search query 134 are detected and escalated by the static analysis engine 124 and vulnerability analysis engine 126. For example, particular potential unpermitted data candidates 150 are detected and escalated through filtering and boosting steps by automatically computing factor weights 140, and category weights 144 based on feedback received from machine learning algorithms 154 and ad-hoc analysis engine 128. Thus, the automatic computing factor weights 140, and category weights 144 may lead to error reduction in identifying false-positive unpermitted data 114 in the code portions 164. The automatic computation of the factor weights 140 and category weights 144 are carried out by automatically performing vulnerability analysis (via vulnerability analysis engine 126), static triage analysis (via the static analysis engine 124), and ad-hoc analysis (via ad-hoc analysis engine 128) as described hereinafter.

Static Analysis Engine

The static analysis engine 124 may be implemented by the processor 120 executing software instructions 132, and is configured to perform automated static analysis triage on data feed from the temporary storage 162 (i.e., indexed source code 118 or code portions 164). In one embodiment, the static analysis engine 124 performs the automated static analysis triage by determining instances of the potential unpermitted data 114 in the indexed sourced code 118 or code portions 164. The indexed source code 118 and code portions 164 are used interchangeably to denote an ability to search through the results of the code indexing step in both indexed source code 118 and code portions 164.

Once the static analysis engine 124 has determined a code portion 164 that includes a potential unpermitted data 114, it may determine whether that potential unpermitted data 114 is relevant (i.e., whether that potential unpermitted data 114 is found in a relevant or an irrelevant part of the code portion 164, such as in a comment). The relevancy of an instance of unpermitted data 114 may be determined based on whether that potential unpermitted data 114 is found in a data flow or control flow of a corresponding code portion 164. In one embodiment, in determining whether a potential unpermitted data 114 in a code portion 164 is relevant, the static analysis engine 124 may use any combination of semantic analysis, data flow analysis, and control flow analysis.

In one embodiment, the static analysis engine 124 updates the relevancy of an instance of unpermitted data 114 based on feedback obtained from the rules tuning step (e.g., from the results of the ad-hoc analysis engine 128 and/or machine learning algorithms 154). The static analysis engine 124 may then triage/assign a degree of urgency to that potential unpermitted data 114. In one embodiment, the automated static analysis triage (via the static analysis engine 124) may be performed in parallel or in series with an error reduction process (via the vulnerability analysis engine 126) that includes the automatic computing of factor weights 140 and category weights 144 of data (i.e., source code 118 or code portions 164) fed from the temporary storage 162.

The static analysis engine 124 performs the automated static analysis triage, and the vulnerability analysis engine 126 performs the automatic computing of factor weights 140 and category weights 144 of code portions 164 based on the rules tuning step in order to produce more accurate results 148.

Performing Semantic Analysis

Using the semantic analysis, the static analysis engine 124 is configured to search for instances of potential unpermitted data 114 throughout the code portions 164. In this process, the static analysis engine 124 searches for one or more keywords 136, strings, symbols, numbers, etc., associated with the potential unpermitted data 114 throughout data fed to it from results 148. In one example, assume that the user 108 wishes to detect instances of vulnerable functions for connecting to databases, where hard-coded credentials are used for connecting to databases. As such, the user 108 specifies keywords 136 associated with vulnerable functions for connecting to databases in a search query 134.

As discussed above, the code portions 164 may be written in different programming languages. In some cases, different programming languages may employ different methods for establishing connections with databases implemented by different technologies, such as SQL (Structured Query Language) Server, Oracle, MongoDB, etc. As such, in order to detect the instances of vulnerable functions for connecting to databases, the keywords 136 are determined such that they include one or more common denominator keywords 136 used in different methods of connecting to databases in different programming languages. For example, in JAVA programming language, a common method of establishing a connection with a database is to implement a Naming and Directory Interface (JNDI) Application Programming Interface (API), in which a database name, database username, database password, and database schema are used in conjunction with other parameters specific to JNDI API to establish the connection. In another example, in Angular programming language, a common method of establishing a connection with a database is to implement a Create, Read, Update, Delete (CRUD) API, in which a database name, database username, and database password are used in conjunction with other parameters specific to CRUD API to establish the connection. In these examples, the common denominator keywords 136 in methods for establishing connections with databases are database name, database username, and database password. As such, in this particular example for detecting instances of vulnerable functions for connecting to databases, the keywords 136 may include database name, database username, and database password. In other words, the static analysis engine 124 (using the semantic analysis) performs pattern matching in order to search for instances of vulnerable functions for connecting to databases (which may be in different programming languages) with databases (which may be implemented in different technologies). However, the semantic analysis in isolation finds these keywords 136 even in locations of no interest, such as in comments of code portions 164, such as after "//" symbol in C++ and JAVA, after "#" symbol in Python and C, etc. Therefore, the static analysis engine 124 may implement data flow analysis and control flow analysis in conjunction with the semantic analysis in order to boost those instances of potential unpermitted data 114 where they are used in the code portions 164.

Performing Data Flow Analysis and Control Flow Analysis

The static analysis engine 124 (using the data flow analysis and control flow analysis) may filter those instances of potential unpermitted data 114 where they are not used or executed, such as in comments of the code portions 164. The static analysis engine 124 (using the data flow analysis) determines transfer paths of variables from where they are created in a code portion 164 to one or more locations where they are used. The static analysis engine 124 (using the control flow analysis) determines the execution paths of those variables throughout that code portions 164.

Continuing the example above for detecting instances of vulnerable functions for connecting to databases, the static analysis engine 124 (using the semantic analysis data in conjunction with flow analysis and the control flow analysis) determines the instances of the keywords 136 where they are used or executed in the plurality of code portions 164. The results from searching for instances of vulnerable functions for connecting to databases (i.e., requested unpermitted data 114) are fetched by the vulnerability analysis engine 126 for further evaluation of whether these instances contain the requested unpermitted data 114.

Vulnerability Analysis Engine

The vulnerability analysis engine 126 may be implemented by the processor 120 executing software instructions 132, and is configured to determine factor weights 140 (of the vulnerability factors 138) and category weights 144 (of the categories 142 of those vulnerability factors 138) associated with the code portions 164. In one embodiment, the vulnerability analysis engine 126 may be implemented using machine learning algorithms, such as, for example, Support Vector Machine (SVM), Naive Bayes, k-Nearest Neighbors, Decision trees, Non-Linear Regression algorithm, Linear Regression algorithm, Logistic Regression, etc. In one embodiment, vulnerability analysis engine 126 automatically computes factor weights 140 and category weights 144 for error reduction in identifying unpermitted data 114 in the source code 118. These computations are adjusted or updated based on feedback from the machine learning algorithms 154 and the ad-hoc analysis engine 128. The feedback from the machine learning algorithms 154 and the ad-hoc analysis engine 128 is used to confirm (or update) the relevancy of various vulnerability factors 138 and categories 142 of corresponding vulnerability factors 138 of the data feed from the temporary storage 162.

Herein, Linear Regression is used in combination with minimax optimization algorithm to determine factor weights 140 and category weights 144 of the data feed from the temporary storage 162. For example, for each indexed source code 118, a score value 152 is computed by calculating a weighted sum of factor weights 140 and their corresponding category weights 144, described hereinafter with respect to Equation 1.

In one embodiment, the vulnerability analysis engine 126 may be implemented using a plurality of Neural Network (NN) layers, Convolutional NN layers (CNN) layers, Long Short Term Memory (LSTM), Recurrent NN (RNN), and/or the like. In one example, the vulnerability analysis engine 126 may use unsupervised machine learning algorithms. In this particular example, the vulnerability analysis engine 126 is given a plurality of code portions 164, and is asked to classify them based on their vulnerability factors 138 and categories 142 of those vulnerability factors 138.

In this process, the vulnerability analysis engine 126 classifies the code portions 164 that are labeled or indexed with the same vulnerability factors 138 and categories 142. For example, the vulnerability analysis engine 126 groups the code portions 164 that are labeled or indexed with the same file type vulnerability factor. In another example, the vulnerability analysis engine 126 groups the code portions 164 that are labeled or indexed with the same security mechanism vulnerability factor. Similarly, the vulnerability analysis engine 126 groups the code portions 164 that are labeled or indexed with other common vulnerability factors 138 and categories 142.

In one embodiment, the vulnerability analysis engine 126 may be given samples of code portions 164 labeled with factor weights 140 and category weights 144, and is asked to learn the association and relationship between those samples of code portions 164 with their corresponding labels of factor weights 140 and category weights 144. For example, assume that a sample code portion 164 is labeled with an uncompiled source code category and a category weight 144 of 10 to that category 142. As such, the vulnerability analysis engine 126 learns that if a code portion 164 is labeled with an uncompiled source code category, to assign a category weight 144 of 10 to that category 142. Similarly, the vulnerability analysis engine 126 learns the associations and relationships between other vulnerability factors 138/categories 142 with their factor weights 140/category weights 144. With this method, the vulnerability analysis engine 126 predicts the factor weights 140 and category weights 144 of code portions 164 which are not labeled with factor weights 140/category weights 144.

In one embodiment, the factor weights 140 and category weights 144 associated with the code portions 164 are determined based on each search query 134 and particular unpermitted data 114 specified in each search query 134. In one example, assume that the user 108 wishes to find instances of hard-coded credentials (as a particular unpermitted data 114) throughout the code portions 164. As such, the user 108 executes a search query 134-1 that includes particular patterns or keywords 136-1 associated with hard-coded credentials, such as employee credentials, database credentials, server credentials, and/or the like. For search query 134-1, static analysis engine 124 searches for instances that include these keywords 136-1 where they are used and/or executed in any of the code portions 164. The vulnerability analysis engine 126 fetches these code portions 164 and identifies their vulnerability factors 138 and categories 142 (of those vulnerability factors 138).

The vulnerability analysis engine 126 then compares the vulnerability factors 138 and categories 142 associated with the fetched code portions 164 (which are not labeled with factor weights 140 and category weights 144) with the vulnerability factors 138 and categories 142 associated with the sample code portions 164 (which are labeled with factor weights 140 and category weights 144). The vulnerability analysis engine 126 groups the unlabeled code portions 164 with sample code portions 164 which have the same (or above a configurable threshold, e.g., 90% similar) vulnerability factors 138 and categories 142. The vulnerability analysis engine 126 determines or predicts the factor weights 140/category weights 144 for those code portions 164 that are in the same group as each sample code portion 164 to be the same as the factor weights 140/category weights 144 of that sample code portion 164. One particular example of determining factor weights 140 and category weights 144 for code portions 164 for identifying instances of hard-coded credentials (as a particular unpermitted data 114) throughout the code portions 164 is illustrated in TABLE 2.

TABLE 2

A particular example of determining factor weights 140-1 and category weights 144-1

| Vulnerability factors 138-1 | factor weights 140-1 | Categories 142-1 | Category weights 144-1 |
|---|---|---|---|
| File type | 8 | Compiled source code | 10 |
| | | Uncompiled source code | 8 |
| | | Configuration file | 6 |
| Security mechanism | 6 | None | 10 |
| | | Weak | 9.5 |
| | | Moderate | 8 |
| | | Strong | 6 |
| | | Vault | 1 |
| Credential type | 4 | UserID | 10 |
| | | Service account | 8 |
| | | Database account | 9 |
| | | Group account | 6 |
| Affinity profile | 5 | Individual | 1 . . . 10 |
| | | Team | 1 . . . 10 |
| | | Software/web/mobile application | 1 . . . 10 |
| Timestamp | 3 | Credential interval periods | 1 . . . 10 |

Determining Weights for File Type Factor and Its Categories

In the particular example illustrated in TABLE 2, different categories 142-1 of the file type vulnerability factors may significantly contribute to the accessibility and vulnerability levels of the code portions 164. In other words, for detecting hard-coded credentials in code portions 164, it is desired to prioritize the file type vulnerability factor of the code portions 164. As such, the factor weight 140 of the file type vulnerability factor is determined to be a high value, e.g., 8 out of 8. If, however, the search query 134-1 was for detecting code portions 164 accessed during a specific period (i.e., a specific timestamp), the factor weight 140 of the timestamp vulnerability factor would be a high value, and the factor weight 140 of the file type vulnerability factor would be lower.

The categories 142-1 of the file type vulnerability factor indicate types or formats in which code portions 164 are stored. If a code portion 164 is found in a compiled source code, it means that the code portion 164 has been compiled and consequently is accessible from a database. As one example, assume that a code portion 164 contains a hard-coded password and is written in JAVA programming language. Once the code portion 164 is compiled, it is stored in a ".CLASS" file on a database that is accessible from a database. As such, the hard-coded password in the compiled code portion 164 is also accessible and may be referenced from that database. In some instances, the hard-coded password in the compiled code portion 164 may be accessed by employees of the organization or third parties by a variety of cyberattacks. As such, the compiled source code category significantly contributes to the accessibility and vulnerability levels of the code portion 164. Thereby, the category weight 144 of the compiled source code category is determined to be the highest value, i.e., 10 out of 10.

The uncompiled source code category indicates that a code portion is found in uncompiled source code. If a code portion 164 is found in uncompiled source code, it is an indication that the code portion 164 has not been executed and/or has not yet been stored in an accessible file in a database. However, the uncompiled code portion 164 is still accessible to the employees who are working on the uncompiled code portion 164. As such, the category weight 144 of the uncompiled source code category is determined to be a lower value, e.g., 8 out of 10.

The configuration file category indicates that the code portion 164 is stored in a configuration file. If a code portion 164 is found in a configuration file, it is an indication that code portion 164 may be stored in a more secure database. In some cases, for establishing a connection with a database, configuration parameters including a hard-coded password for connecting to that database are stored in a separate configuration file which is stored in a more secure database. As such, even if the code portion 164 contains a hard-coded password, it may have a lesser effect on the accessibility and vulnerability levels of that code portion 164 because it is stored in a configuration file in a more secured database. Thereby, the category weight 144 of the configuration file category is determined to be a medium value, e.g., 6 out of 10. In other examples, the file type vulnerability factor may include other categories 142.

Determining Weights for Security Mechanism Factor and its Categories

In the particular example illustrated in TABLE 2, different security mechanisms used in code portions 164 may significantly contribute to the vulnerability level of the code portions 164. In the exemplary search query 134-1 for finding hard-coded passwords in code portions 164, if a code portion 164 is labeled with no security mechanism (i.e., none), a weak, moderate, strong, or vault security mechanism, the vulnerability level of that code portion 164 is significantly affected. As such, the factor weight 140 of the security mechanism vulnerability factor is determined to be a high value, e.g., 6 out of 8.

The categories 142-1 of the security mechanism vulnerability factor indicates the types and strengths of security mechanisms used in the code portions 164. For example, assume that a programmer in the organization has been tasked to encrypt a password in a code portion 164.

In a first case (i.e., "none" security category), assume that the programmer has not used any security mechanism to encrypt that password, and defined that password as a string. In this case, not using any security mechanism significantly increases the vulnerability level of the code portion 164. As such, the category weight of the none security category is determined to be the highest value, i.e., 10 out of 10.

In a second case (i.e., weak security category), assume that the programmer has used a weak security mechanism, such as Base 64 encryption mechanism to encrypt that password. In this case, using a weak encryption mechanism still increases the vulnerability level of the code portion 164, however, less than the first case where no security mechanism was used. As such, the category weight 144 of the weak security category is determined to be a high value, i.e., 9.5 out of 10.

In a third case (i.e., moderate security category), assume that the programmer has used a moderate encryption mechanism, such as SHA1, MD5, or any simple 2-way hashes to encrypt that password. In this case, using a moderate encryption mechanism still increases the vulnerability level of the code portion 164, however, less than the second case where a weak security mechanism was used. As such, the category weight 144 of the moderate security category is determined to be a high value, i.e., 8 out of 10.

In a fourth case (i.e., strong security category), assume that the programmer has used a strong encryption mechanism, such as Advanced Encryption Standard (AES), Rivest, Shamir, and Adleman (RSA), etc. to encrypt that password. In this case, using a strong encryption mechanism still increases the vulnerability level of the code portion 164, however, less than the third case where a moderate security mechanism was used. Using strong encryption mechanisms may also be bypassed in a reasonable time by cyberattacks from a third party. As such, the category weight 144 of the strong security category is determined to be a medium value, i.e., 6 out of 10.

In a fifth case (i.e., vault security category), assume that the programmer not only has used a strong encryption mechanism to encrypt that password but also stored it in a secured database or a vault. In this case, it would be incredibly difficult to access that password. As such, the category weight 144 of the vault security category is determined to be a low value, e.g., 1 out of 10. In other examples, the security mechanism vulnerability factor may include other categories 142.

Determining Weight for Credential Type Factor and its Categories

In the particular example illustrated in TABLE 2, any hard-coded password with any credential type is of interest. In other words, in the exemplary search query 134-1 for finding hard-coded passwords in code portions 164, determining the credential types of the hard-coded passwords is not a priority. As such, the factor weight 140 of the credential type vulnerability factor is determined to be a low value, e.g., 4 out of 8. The categories 142 of the credential type vulnerability factor indicate credential types of hard-coded passwords found in code portions 164. The userID credential category indicates that the hard-coded password found in a code portion 164 is associated with a particular employee in the organization. This scenario may occur if the particular employee has included his/her password as a string in the code portion 164. In such scenarios, that particular employee may be held liable for causing a vulnerability risk in that code portion 164. In some cases, the category weight of the userID credential category may vary depending on an authority level of a particular employee of the organization who has hard-coded his/her password in a code portion 164.

In one example, assume that a code portion 164 contains a hard-coded password for a userID associated with a first employee of the organization. Also, assume that the first employee has a high authority level, such that he/she has access to databases which store confidential information. As such, the userID credential category may significantly contribute to the vulnerability, accessibility, and importance levels of that code portion 164. Therefore, the category weight 144 of the userID credential category is determined to be the highest value, i.e., 10 out of 10.

The service account credential category is related to non-user accounts dedicated to servers within the organization. In some cases, a service account credential may be dedicated to a set of servers within the organization. The service account credentials are used by the servers within the organization for granting access to different services, such as accessing other servers, databases, etc. The service account credentials may have different privileges. For example, a first service account credential may be used to grant access to particular databases that store confidential information.

In another example, a second service account credential may be used to grant access to a particular server that is configured to send/receive API requests to/from other servers. Thus, if a hard-coded password found in the code portion 164 is associated with a service account, it may significantly contribute to the vulnerability level of the code portion 164. As such, the category weight 144 of the service account credential category is determined to be a high value, e.g., 8 out of 10.

In some cases, the database account category may be related to credentials associated with databases within the organization. Databases within the organization may store different sorts of information. In a first example, assume that a first database stores confidential information associated with clients of the organization, and/or the like. As such, if the hard-coded password found in a code portion 164 is associated with the first database, the vulnerability analysis engine 126 may assign a high value, e.g., 9 out of 10 to the category weight 144 of the database account category.

In a second example, assume that a second database stores public information associated with the organization, such as public reports from previous years, and/or the like. As such, if the hard-coded password found in the code portion 164 is associated with the second database, the category weight 144 of the database account category is determined to be a low value, e.g., 4 out of 10.

In other cases, the database account category may be related to credentials associated with database users within the organization. Database users within the organization may have different privilege levels to access different databases within the organization. In a first case, assume that a first database user has a high privilege level, such as read-and-write access, to a first database that stores confidential information. In this case, the first database user has an administrative privilege to add, edit, remove, update the confidential information stored in the first database. The first database user may also be able to grant permissions to other employees of the organization to access the first database. The first database user may also be able to remove permissions from other employees of the organization to access the first database. Thus, if the hard-coded password found in the code portion 164 is associated with the first database user, it may significantly contribute to the accessibility and vulnerability levels of the code portion 164. As such, the category weight 144 of the first database user (i.e., the database account credential category) is determined to be a high value, e.g., 9 out of 10.

In a second case, assume that a second database user has a low privilege level, such as read-only access, to the first database (discussed above) that stores confidential information associated with the organization. In this case, even though the second database user has a low privilege level (i.e., read-only access) to the first database, it significantly contributes to the accessibility and vulnerability levels of the code portion 164 because the first database stores confidential information. As such, if the hard-coded password found in the code portion 164 is associated with the second database user, the category weight 144 of the second database user (i.e., the database account credential category) is determined to be a high value, e.g., 8 out of 10.

In a third case, assume that a third database user has a high privilege level, such as read-and-write access, to a second database that stores public information. As such, the category weight 144 of the third database user (i.e., the database account credential category) is determined to be a medium value, e.g., 5 out of 10.

The group privileged credential category is related to user credentials that are shared between members of each group of employees in the organization. For example, assume that a group of employees has worked on a particular code portion 164. Also, assume that this group of employees has been granted access to a particular database that stores confidential information. Also, assume that the members of this group are given the same credentials (i.e., group credentials) to access that particular database. Thus, if the group credential is compromised, any of the members of this group may be liable. As such, the group privilege credential category may also contribute to the vulnerability level of the code portion 164. Thus, the category weight 144 of the group privilege credential category is determined to be a medium value, e.g., 6 out of 10. In other examples, the credential type vulnerability factor may include other categories 142.

Determining Weights for Affinity Profile Factor and Its Categories

In the particular example illustrated in TABLE 2, any code portion 164 labeled or indexed with any affinity profile vulnerability factor is of interest. In other words, in the exemplary search query 134-1 for finding hard-coded passwords in code portions 164, determining the affinity levels of employees, team of employees, or software/web/mobile applications of the organization is not a priority. As such, the factor weight 140 of the affinity profile vulnerability factor is determined to be a low value, e.g., 4 out of 8. If, however, the search query 134-1 includes a statement to find code portions 164 with are labeled with the employees, team of employees, or software/web/mobile applications with high-affinity levels, the factor weight 140 of the affinity profile vulnerability factor is determined to be a high value, e.g., 6 out of 8.

In a first case (i.e., individual affinity profile category), the affinity profile vulnerability factor indicates affinity levels of employees of the organization. Each employee of the organization may be associated with a particular affinity level. An affinity level of an employee of the organization is determined based on historical records of that employee and whether he/she has contributed to sources of vulnerabilities or unpermitted data 114 in one or more code portions 164.

In one embodiment, the affinity level of an employee in the organization may change during his/her employment. For example, assume that a first employee of the organization has checked-in a first code source 118 fifty times in a particular period, e.g., in March 2018. Also, assume that during three of those fifty check-ins, the first employee has caused a first source of vulnerability in the first code portion 164-1 that in isolation is a minor source of vulnerability. As such, in March 2018, the affinity level of the first employee was a low value, e.g., 2 out of 10. Also, assume that, later in March 2019, the first employee has caused a second source of vulnerability in a second code portion 164-2, where the composite of the first and second source of vulnerabilities is a major source of vulnerability. As such, by March 2019, the affinity level of the first employee was increased to a medium value, e.g., 7 out of 10. Thus, by tracking the trend of pieces that have led to the major source of vulnerability, the affinity level of the first employee is mapped with the sources of vulnerabilities at particular times which he/she has caused. With this method, the causes of the major sources of vulnerabilities can are identified.

In a second case (i.e., team affinity profile category), the affinity profile vulnerability factor indicates affinity levels of groups of employees in the organization. For example, assume that a group of employees is working on a particular code portion 164. Also, assume that this group of employees has been granted access to a particular database that stores confidential information. Also, assume that members of this group are given the same credentials (i.e., group credentials) to access that particular database. Thus, if the group credential is compromised, any of the members of this group may be liable. In such cases, a common affinity level is shared among the member of the group of employees (separate from their individual affinity levels).

The common affinity level may be determined based on the sensitivity level of the confidential information stored in a particular database. Therefore, the category weight 144 of the team affinity profile category is determined to be any value (e.g., from 1 to 10) based on the sensitivity level of the confidential information accessible to the members of each group of employees.

In a third case (i.e., software/web/mobile application affinity category), the affinity profile vulnerability factor indicates affinity levels of the code portions 164. In a first example, assume that the organization has purchased a particular proprietary source code 118 from a company. Also, assume that the particular proprietary source code 118 includes methods, functions, scripts, data, and/or the like which include sources of vulnerabilities either in isolation or in combination with one or more existing source code 118 in the organization. In other words, the purchased proprietary source code 118 conflicts (or is not compatible) with one or more of the existing source code 118 or technologies used in the organization. Therefore, the category weight 144 of the software/web/mobile application affinity category is determined to be a high value, e.g., 8 out of 10.

In some cases, the employees of the organization may use different code portions 164 of the purchased proprietary source code 118 in different source code 118 without knowing that they may lead to sources of vulnerabilities. Thus, by tracking the code portions 164 of the proprietary source code 118 as they are used in the existing source code 118 and their affinity levels, sources of vulnerabilities that they may cause can be determined.

In a second example, assume that a group of employees of the organization has developed a particular application (e.g., a software/web/mobile application) using particular source code 118 for internal and/or external use. Also, assume that one or more code portions 164 of the particular source code 118 include sources of vulnerabilities that have not been detected. Also, assume that those code portions 164 of the particular source code 118 with the sources of vulnerabilities have spawned to or used in other source code 118. As such, the category weight 144 of the software/web/mobile application affinity category is determined to be a high value, e.g., 8 out of 10. In other examples, the affinity profile vulnerability factor may include other categories 142.

Determining Weights for Timestamp Factor and its Categories

In the particular example illustrated in TABLE 2, any code portion 164 labeled or indexed with any timestamp is of interest. In other words, in the exemplary search query 134-1 for finding hard-coded passwords in code portions 164, determining the times when the hard-coded passwords are included in the code portions 164 is not a priority. As such, the factor weight 140 of the timestamp vulnerability factor is determined to be a low value, e.g., 3 out of 8. If, however, the search query 134-1 includes a statement to find code portions 164 which hard-coded passwords are added to them in a specific period, the factor weight 140 of the timestamp vulnerability factor is determined to be a high value, e.g., 6 out of 8.

The timestamp vulnerability factor indicates periods when each code portion 164 is accessed by different employees of the organization. The categories 142 of the timestamp vulnerability factor may be linked to or indicate the affinity levels of the employees of the organization at different timestamps when they have accessed a code portion 164. Therefore, category weights 144 of the timestamp categories may be determined based on the affinity levels of the employees of the organization.

In a first example, assume that a first employee of the organization has checked-in and checked-out a first code portion 164 during a first period (i.e., a first timestamp). Also, assume that during the first timestamp the first employee had a high-affinity level, e.g., 9 out of 10. In other words, the historical records of the first employee at the time he/she accessed the first code portion 164 indicate that he/she has previously contributed or caused several high vulnerability sources in one or more code portions 164 and/or in one or more projects regardless of whether he/she was in the same or a different department within the organization.

Based on the historical records of the first employee (during the first timestamp), a probability or likelihood of finding a source of vulnerability in any code portion 164 caused by the first employee is high. Thus, in this case, the category weight 144 of the first timestamp associated with the first employee is determined to be a high value, e.g., 9 out of 10.

In a second example, assume that the first employee of the organization (discussed above in the first example) has checked-in and checked-out a second code portion 164 during a second period (i.e., a second timestamp). Also, assume that during the second timestamp the first employee had a low-affinity level, e.g., 1 out of 10. In other words, the historical records of the first employee at the time he/she accessed the second code portion 164 indicates that he/she has not contributed or caused any vulnerability sources regardless of whether he/she was in the same or a different department within the organization.

Based on the historical records of the first employee (during the second timestamp), a probability or likelihood of finding a source of vulnerability (e.g., hard-coded passwords) in any code portion 164 caused by the first employee is low. Thus, in this case, the category weight 144 of the second timestamp associated with the first employee is determined to be a low value, e.g., 1 out of 10. Therefore, the affinity levels of each employee of the organization are tracked and linked to timestamps when they access code portions 164. This association is used in ranking possible sources of vulnerabilities or unpermitted data 114 throughout the code portions 164. In other examples, the timestamp vulnerability factor may include other categories 142.

The vulnerability factors 138, factor weights 140, categories 142, and category weights 144 illustrated in TABLE 2 are exemplary and are not meant to limit the scope of this disclosure. In other search queries 134, factor weights 140, categories 142, and category weights 144 may be determined based on particular criteria specified in those search queries 134.

Calculating Score Values

Once the factor weights 140 (of the vulnerability factors 138) and category weighs 144 (of the categories 142 of those vulnerability factors 138) associated with each code portion 164 are determined, the vulnerability analysis engine 126 calculates the score value 152 of each code portion 164. The score value 152 of each code portion 164 is calculated by the sum of multiplications of each factor weight 140 with its corresponding category weight 144, as shown in the equation (1) below:

$$\text{Score value}_i = \Sigma_1{}^n \text{Factor weight}_n \times \text{Category weight}_n \quad \text{Equation (1)}$$

Where i represents the number of each code portion 164 and n represents the number of each vulnerability factor 138 and its corresponding category weight 144. Once the vulnerability analysis engine 126 determines the score values 152 of the code portions 164, it stores them as the results 148 in the query result database 146. The vulnerability analysis engine 126 may also rank these score values 152 from the smallest to the largest.

Using a Linear Regression Algorithm

In one embodiment, the vulnerability analysis engine 126 may represent these score values 152 in a linear Cartesian space against which curve-fitting can be performed. In the curve-fitting process, the vulnerability analysis engine 126 determines a function that best fits the series of score values 152 illustrated in the linear Cartesian space. In using the linear regression algorithm, the vulnerability analysis engine 126 determines a function of a regression line that follows the trend of the score values 152 (associated with the code portions 164) while keeping a minimum distance from them (i.e., producing the Minimum Mean Square Error (MMSE)). As such, the vulnerability analysis engine 126 predicts that code portions 164 with the same (or within a configurable threshold error, e.g., 1% apart) score values 152 are more likely uniform in including the unpermitted data 114 or not.

Using a Minimax Optimization Algorithm

In one embodiment, the vulnerability analysis engine 126 may use the Minimax optimization algorithm to adjust the factor weights 140 and category weights 144 associated with the code portions 164, such that the total score values 152 associated with the code portions 164 illustrated in the results 148 do not over-fluctuate. In other words, the vulnerability analysis engine 126 (using the Minimax optimization algorithm) adjusts the factor weights 140 and category weights 144 associated with the code portions 164 to reduce over-producing peaks (i.e., too many high score values 152) and/or valleys (i.e., too many low score values 152) in the results 148. In other words, the vulnerability analysis engine 126 (using the Minimax optimization algorithm) is modeled to avoid overfitting and underfitting with respect to determining the factor weights 140 and category weights 144 associate with the code portions 164.

Ad-Hoc Analysis Engine

The ad-hoc analysis engine 128 may be implemented by the processor 120 executing software instructions 132, and is configured to determine instances of potential unpermitted data 114 throughout the code portions 164. In one embodiment, the ad-hoc analysis engine 128 determines the instances of potential unpermitted data 114 by searching for an abstract set of rules or methods that cause those unpermitted data 114.

In one embodiment, the ad-hoc analysis engine 128 is provided an interpreter or a script (e.g., programmed by a developer) that is configured to identify those abstract set of rules or methods in any programming language. The interpreter may be implemented using any pattern matching algorithms, NLP algorithms, and/or the like. The ad-hoc analysis engine 128 may be provided different interpreters for different particular unpermitted data 114.

For example, assume that a first unpermitted data 114 that is desired to be detected is improper or unauthorized connections with databases throughout the code portions 164. As discussed above, different programming languages may have used different protocols and parameters to establish connections with databases. However, at a fundamental level, every programming language follows a set of abstract rules to establish connections with databases. For example, in order to establish a connection with a database in any programming language, a hostname (i.e., a name of the database), a database username, a database password, and optionally database schema are defined. Additionally, in order to encrypt the database password, any programming language follows one or more abstract or standard encryption methods. For example, one set of abstract or standard encryption method includes defining an encrypted string (as the database password), generating an encryption key, generating an encryption salt, concatenating the encryption salt with the encrypted string, and generating a secret key which is the hashed concatenation of the encryption salt and the encrypted string. In this particular example, the ad-hoc analysis engine 128 is provided a first interpreter that is programmed to search for instances of any of the parameters identified above used for connecting to a database that has an unauthorized operation done it, e.g., by an encryption key, decryption key, and/or the like.

For example, the first interpreter may identify instances of unauthorized decryption functions for decrypting the encrypted string with a decryption key. In another example, the first interpreter may identify instances of unauthorized decryption functions for decrypting the secret key with a decryption key. With this method, the ad-hoc analysis engine 128 (using the first interpreter) detects instances of improper or unauthorized connections with databases in the code portions 164 in any programming language.

As discussed above, results from the ad-hoc analysis engine 128 are used in the rules tuning step to adjust factor weights 140 and category weights 144 (performed by the vulnerability analysis engine 126) as well as to adjust the automated static analysis triage (performed by the static analysis engine 124). Thereby, more relevant results (i.e., more accurate instances of unpermitted data 114) are produced to input the machine learning algorithms 154. The machine learning algorithms 154 are configured to identify the unpermitted data 114 from a plurality of potential unpermitted data candidates 150. For example, the machine learning algorithms 154 may use NLP techniques to extract features of the potential unpermitted data candidates 150 and the unpermitted data 114. The machine learning algorithms 154 may then compare the features of the potential unpermitted data candidates 150 with the features of the unpermitted data 114.

If the features of a potential unpermitted data candidate 150 match (above a threshold percentage, e.g., 80%) the features of the unpermitted data 114, it is determined that the potential unpermitted data candidate 150 is an instance of the unpermitted data 114, i.e., the prediction that the potential unpermitted data candidate 150 is an instance of the unpermitted data 114 is true-positive or valid. If the features of the potential unpermitted data candidate 150 do not match (or match below a threshold percentage, e.g., 80% of) the features of the unpermitted data 114, it is determined that the potential unpermitted data candidate 150 is not an instance of the unpermitted data 114, i.e., the prediction that the potential unpermitted data candidate 150 is an instance of the unpermitted data 114 is false-positive or not valid.

The validity of unpermitted data 114 identified by the machine learning algorithms 154 is subsequently confirmed (or updated), for example, by a developer. The results from the ad-hoc analysis engine 128 are used as a training dataset for the machine learning algorithms 154 to adjust the automatic calculations of the factor weights 140 and category weights 144 associated with code portions 164.

Referring to the example of the first interpreter discussed above, the vulnerability analysis engine 126 identifies the instances of improper or unauthorized connections with databases provided by the ad-hoc analysis engine 128 and increases the factor weights 140 and category weights 144 of the code portions 164 which include those instances. As such, the score values 152 of the code portions 164 which include those instances of improper or unauthorized connections with databases are increased. Thus, those code portions 164 are ranked higher in the results 148. With this method, the ad-hoc analysis engine 128 provides more accurate instances of each particular unpermitted data 114 throughout the code portions 164 (i.e., as a training dataset) to the vulnerability analysis engine 126.

The vulnerability analysis engine 126 may be configured to identify those code portions 164 that have score values 152 higher than a configurable threshold value 156 (e.g., 90%) as potential unpermitted data candidates 150 that are more likely to include more severe unpermitted data 114 or sources of vulnerabilities. In one embodiment, the potential unpermitted data candidates 150 are investigated by a developer. The feedback from the developer is used as another training dataset for further adjusting and tuning automatic calculations of factor weights 140 and category weights 144 associated with the code portions 164. Details of using the feedback of the developer as another training dataset are described in method 200 illustrated in FIG. 2.

Report Customization Engine

Report customization engine 158 may be implemented by the processor 120 executing software instructions 132, and is configured to customize the results 148 based on the entitlements or authority levels of the employees (e.g., users 108) of the organization. As discussed above, in some cases, the unpermitted data 114 may be related to confidential data, such as hard-coded passwords of users 108/servers/databases/applications of the organization. As such, report customization engine 158 customizes the results 148 for each user 108 based on his/her entitlement or authority level.

For example, assume that the second search query 134-2 is conducted to identify instances of hard-coded credentials in the code portions 164. Once the results 148 are generated, the report customization engine 158 identifies the credentials of each user 108 which he/she is using to log in to his/her organization account to view the results 148. The report customization engine 158 searches through the results 148 and identifies the hard-coded credentials in the code portion 164 that do not match the credentials that are used for logging in to a particular organization account to view the results 148. For example, the report customization engine 158 may use pattern matching techniques to detect whether hard-coded credentials match the credentials of a user 108 used for logging in to a particular organization account to view the results 148. The report customization engine 158 masks those hard-coded credentials, e.g., by covering them with filled shapes. In this particular example for identifying hard-coded credentials, assume that the results 148 include code portions 164 in which credentials of the first user 108-1 and the second user 108-2 are hard-coded.

In the case of the first user 108-1, the report customization engine 158 identifies the credentials of the first user 108-1 which he/she is using for logging in to his/her organization account to view the results 148. The report customization engine 158 searches through the results 148 to identify the hard-coded credentials that do not match the credentials of the first user 108-1. In this particular example, the report customization engine 158 identifies that the credentials of the second user 108-2 do not match the credentials of the first user 108-1 (which he/she used to login to his/her organization account). Thus, the report customization engine 158 masks the hard-coded credentials of the second user 108-2 in the results 148 accessed by the first user 108-1.

In the case of the second user 108-2, the report customization engine 158 identifies the credentials of the second user 108-2 which he/she is using for logging in to his/her organization account to view the results 148. The report customization engine 158 searches through the results 148 to identify the hard-coded credentials that do not match the credentials of the second user 108-2. In this particular example, the report customization engine 158 identifies that the credentials of the first user 108-1 do not match the credentials of the second user 108-2 (which he/she used to login to his/her organization account). Thus, the report customization engine 158 masks the hard-coded credentials of the first user 108-1 in the results 148 accessed by the second user 108-2. As such, the report customization engine 158 may customize the results 148 for each user 108 so that only a particular user 108 whose credentials are hard-coded in the code portions 164 is able to view his/her hard-coded credentials in the results 148. In a particular use case for identifying insider threats, results from identifying the insider threats may be kept confidential from the employees, because otherwise, an insider may cover his/her tracks in the source code, e.g. by removing those instances of security vulnerabilities he/she caused.

Example Method for Detecting Unpermitted Data in Source Code

Figure 2:
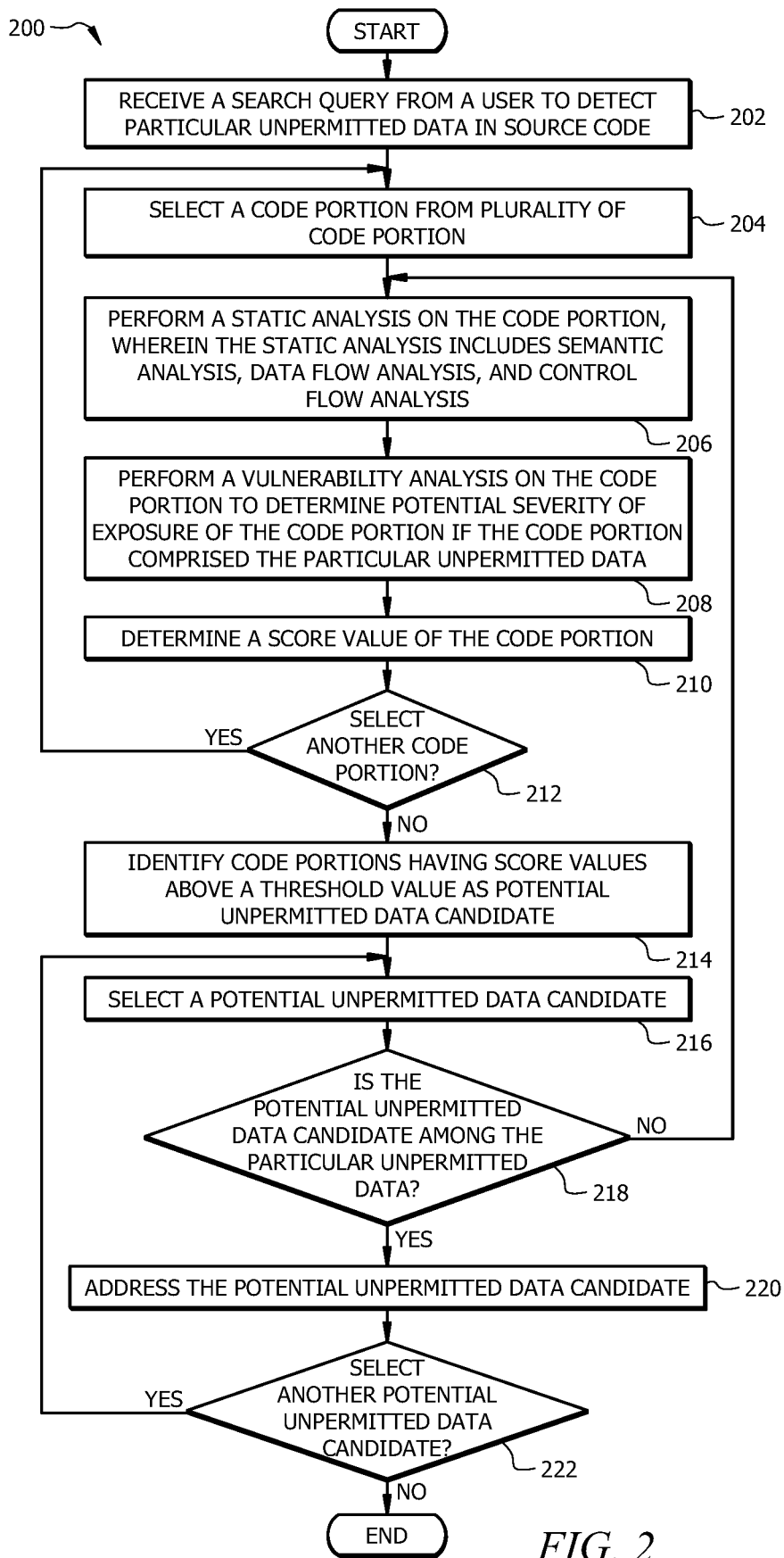
FIG. 2 illustrates an example of a flow chart of a method for identifying unpermitted data in source code.

FIG. 2 illustrates a flow chart of a method 200 for detecting unpermitted data in source code 118. One or more of steps 202-222 of the method 200 may be implemented, at least in part, in the form of software instructions 132 stored on non-transitory, tangible, machine-readable media (e.g., memory 130) that when run by one or more processors (e.g., processor 120) may cause the one or more processors to perform steps 202-222. In some embodiments, method 200 may be performed on system 100 of FIG. 1, including the computing device 102, processor 120, and memory 130. Aspects of the steps 202-222 of the method 200 have been covered in the description for FIG. 1; and additional aspects are provided below.

The method 200 begins at step 202 where the user 108 executes a search query 134, e.g., by entering the search query 134 on a user interface of the computing device 102. The batch processing engine 122 performs the indexing and labeling different code portions 164 prior to step 202, as described with respect to FIG. 1 and TABLE 1. Therefore, the indexed code portions or source code 118 are stored in the temporary storage 162. The indexed code portions or source code 118 are labeled, for example, with their corresponding vulnerability factors 138 and categories 142 of those factors 138. Thus, the indexed code portions 164 or source code 118 are query-searchable by using their vulnerability factors 138 and categories 142 of those factors 138.

The search query 134 may include statements that specify a particular unpermitted data 114, such as hard-coded credentials, improper/inadequate/weak encryption mechanisms, improper/inadequate/weak validation methods, improper/inadequate/weak authentication methods, etc., as described above in FIG. 1. In some examples, the search query 134 may include one or more particular keywords 136 associated with the particular unpermitted data 114. In some examples, the search query 134 may include statements that include particular vulnerability factors 138, such as file type vulnerability factor, cryptography mechanism factor, credential type vulnerability factor, affinity profile factor 139-4, timestamp vulnerability factor, etc. In some examples, the search query 134 may include statements that include the categories 142 of one or more of those vulnerability factors 138.

In step 204, the static analysis engine 124 selects a code portion 164 (e.g., code portion 164-1) from among the plurality of code portions 164 for evaluating whether the selected code portion 164 contains the particular unpermitted data 114. The static analysis engine 124 iteratively selects a code portion 164 from among the plurality of code portions 164 for evaluation until no more code portion 164 is left.

In step 206, the static analysis engine 124 performs the static analysis on the selected code portion 164. In one embodiment, the static analysis engine 124 performs the static analysis on the selected code portion 164 by performing the semantic analysis, data flow analysis, and control flow analysis, as described in FIG. 1.

By performing the semantic analysis, data flow analysis, and control flow analysis, the static analysis engine 124 identifies instances of the particular keywords 136 where they are used or executed in the code portion 164. With this method, the static analysis engine 124 boosts the instances of the particular keywords 136 where they are used or executed in the code portion 164, and filters instances of the particular keywords 136 which are of no interest, such as in comments of the code portion 164 in order to reduce false-positive instances of the requested unpermitted data 114.

In step 208, the vulnerability analysis engine 126 performs the vulnerability analysis on the code portion 164 in series or in parallel with the static analysis to determine a potential severity of exposure of the code portion 164 if it comprised the particular unpermitted data 114. The vulnerability analysis engine 126 also performs the vulnerability analysis on the code portion 164 in series or in parallel with the static analysis to reduce false positive instances of the requested unpermitted data 114. In this process, the vulnerability analysis engine 126 determines factor weights 140 (of the vulnerability factors 138) and category weights 144 (of the categories 142) associated with the code portion 164, as described in FIG. 1.

The vulnerability analysis engine 126 determines the factor weights 140 and category weights 144 associated with the code portion 164 based on each particular search query 134, such as the example of search query 134-1 for detecting hard-coded passwords described with respect to TABLE 2.

In step 210, the vulnerability analysis engine 126 determines the score value 152 associated with the code portion 164 by calculating the sum of multiplications of each factor weight 140 with its corresponding category weight 144 associated with that code portion 164, as described in FIG. 1.

In step 212, the vulnerability analysis engine 126 determines whether to select another code portion 164. Here, the vulnerability analysis engine 126 determines whether all of the code portions 164 have been evaluated. For example, the vulnerability analysis engine 126 determines to select another code portion 164 when at least one code portion 164 has not yet been evaluated. If the vulnerability analysis engine 126 determines that any code portion 164 has not yet been evaluated, the method 200 returns to step 204 where another code portion 164 is selected for evaluation. Otherwise, method 200 proceeds to step 214. Once all the code portions 164 have been evaluated (i.e., their score values 152 are determined), the vulnerability analysis engine 126 stores them as the results 148 in the query result database 146, as described in FIG. 1.

In step 214, the vulnerability analysis engine 126 identifies the code portions 164 (from the results 148) having score values 152 above the configurable threshold 156 (e.g., 90%) as the potential unpermitted data candidate 150. As discussed above, code portions 164 having high score values 152 is an indication that the probability of those code portions 164 containing more severe instances of the particular unpermitted data 114 is high. Also, it is an indication that the vulnerability and importance levels of those code portions 164 with high score values 152 are high. In other words, the severity or risk of exposure of the code portions 164 with high score values 152 is high if those code portions 164 contain the particular unpermitted data 114. Therefore, investigating those code portions 164 (with high score values 152) is the priority.

In step 216, the vulnerability analysis engine 126 selects one of the potential unpermitted data candidates 150 (i.e., code portions 164 having score values 152 above the configurable threshold 156) for investigation. The vulnerability analysis engine 126 iteratively selects a potential unpermitted data candidate 150 until all the potential unpermitted data candidates 150 are investigated.

In step 218, the unsupervised machine learning algorithms 154 determine whether the selected potential unpermitted data candidate 150 is among the particular unpermitted data 114. For example, unsupervised machine learning algorithms 154 determine whether the selected potential unpermitted data candidate 150 is among the particular unpermitted data 114 by extracting and comparing features of the potential unpermitted data candidates 150 with features of the particular unpermitted data 114. For example, the unsupervised machine learning algorithms 154 may use NLP techniques to extract features of the potential unpermitted data candidates 150 and the particular unpermitted data 114. As such, the unsupervised machine learning algorithms 154 predict whether the selected potential unpermitted data candidate 150 can be classified with any of the particular unpermitted data 114. If it is determined that the selected potential unpermitted data candidate 150 can be classified with any of the particular unpermitted data 114

(i.e., it is among the particular unpermitted data 114), the method 200 proceeds to step 220.

If it is determined that selected potential unpermitted data candidate 150 cannot be classified with any of the particular unpermitted data 114 (i.e., it is not among the particular unpermitted data 114), the method 200 returns to step 206. In other words, predicting that the selected potential unpermitted data candidate 150 is as an instance of particular unpermitted data 114 is a false-positive (i.e., not valid).

In another example, the unsupervised machine learning algorithms 154 determine whether the selected potential unpermitted data candidate 150 is among the particular unpermitted data 114 by extracting and comparing features of the potential unpermitted data candidates 150 with features of a set of known unpermitted data 114. In another example, the prediction from the machine learning algorithms 154 may be validated (or updated) by a developer.

With this method, system 100 (in particular, static analysis engine 124, vulnerability analysis engine 126, and unsupervised machine learning algorithms 154) learns from successes and failures of the unsupervised machine learning algorithms 154. In other words, system 100 learns to predict more accurate potential unpermitted data candidates 150 from correct and false predictions of the unsupervised machine learning algorithms 154.

The feedback from the unsupervised machine learning algorithms 154 is passed to the static analysis engine 124 and the vulnerability analysis engine 126 to filter inaccurate and boost accurate instances of unpermitted data 114, as described in FIG. 1. The feedback from the machine learning algorithms 154 is also used by the vulnerability analysis engine 126 to automatically adjust or tune the factor weights 140 and/or category weights 144 associated with the code portions 164, as described in FIG. 1. The ad-hoc analysis engine 128 may provide a training dataset for the vulnerability analysis engine 126, as described in FIG. 1. The vulnerability analysis engine 126 uses this training dataset to automatically adjust or tune the factor weights 140 and/or category weights 144 associated with code portions 164. The results 148 are ranked based on their score values 152 which indicate the severity of the potential unpermitted data candidates 150. Therefore, high ranked code portions 164 in the results 148 (or high ranked potential unpermitted data candidates 150) contain more severe instances of the particular unpermitted data 114.

In step 220, the potential unpermitted data candidate 150 is addressed, e.g., by a developer finding and removing the causes of that instance of the potential unpermitted data candidate 150.

In step 222, the vulnerability analysis engine 126 determines whether to select another potential unpermitted data candidate 150. The vulnerability analysis engine 126 selects another potential unpermitted data candidate 150 if at least one potential unpermitted data candidate 150 is left for evaluation. If it is determined that at least one potential unpermitted data candidate 150, the method 200 returns to step 216. Otherwise, the method 200 is terminated.

Example System for Identifying Insider Threats in Source Code

Figure 3:
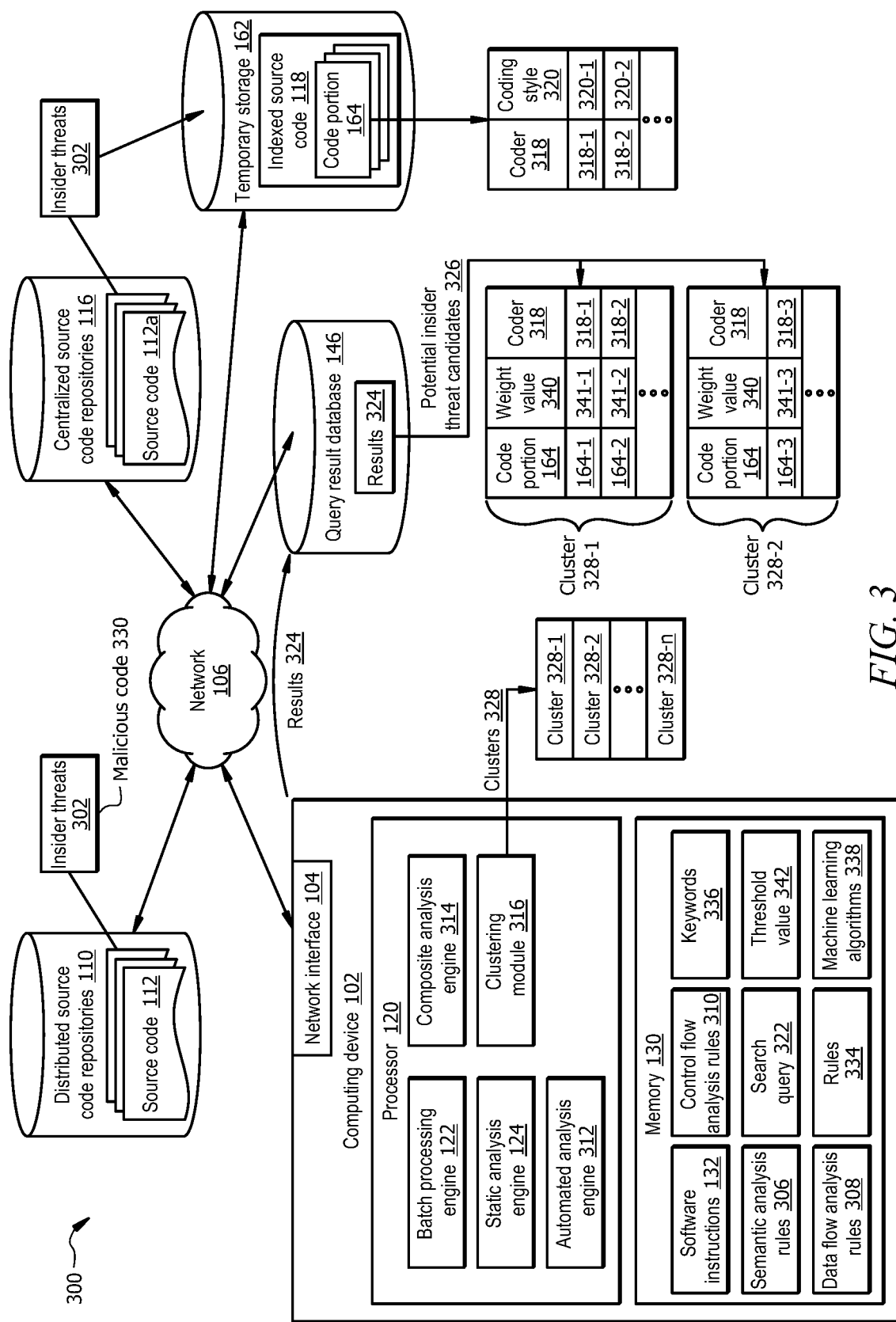
FIG. 3 illustrates one embodiment of a system configured to identify insider threats in source code.

FIG. 3 illustrates one embodiment of system 300 configured to identify insider threats 302 in source code 112. In one embodiment, the system 300 may share one or more components with the system 100 of FIG. 1. For example, system 300 comprises computing device 102 that includes the processor 120 in signal communication with the memory 130 and the network interface 104, as described in FIG. 1. Memory 130 includes software instructions 132 that when executed by the processor 120, cause the computing device 102 to perform one or more functions described herein. The computing device 102 is configured to communicate with distributed source code repositories 110, centralized source code repositories 116, and query result database 146, temporary storage 162, and rules database 304 via the network interface 104 through network 106. The distributed source code repositories 110, centralized source code repositories 116, query result database 146, temporary storage 162, and rules database 304 provide information that may be used by software instructions 132 and/or processors 120. In one embodiment, the processor 120 executes software instructions 132 to implement the batch processing engine 122, static analysis engine 124, report customization engine 158, automated analysis engine 312. In other embodiments, system 100 may not have all of the components listed and/or may have other elements instead of, or in addition to, those listed above.

In general, system 300 improves insider threat detection technologies by increasing the accuracy in determining whether an instance of insider threat is legitimate. In particular, the system 300 performs an automated analysis (by the automated analysis engine 312) on the sources code 112 that is designed by a set of rules 334 to find code portions 164 comprising instances of insider threats 302. The set of rules 334 indicate known or expected patterns to be used coding patterns to obfuscate insider threats 302 (or malicious code 330). The results from the automated analysis are passed to the static analysis engine 124 to perform semantic analysis, data flow analysis, and control flow analysis. These analyses are configured to tuned to find instances of 1) particular keywords 336 related to insider threat targets and functions used to conduct insider threats 302 (by the semantic analysis); 2) external data is found (by the data flow analysis); and 3) an executing path of code is not in the mainline or mainstream of operation (i.e., a non-mainline code where layering is used to obfuscate an insider threat 302) (by the control flow analysis). These results are passed to the composite analysis engine 314 to detect points of correlations between them. Based on the number of points of correlations found between individual results from the semantic analysis, data flow analysis, and control flow analysis, the composite analysis engine 314 assigns weight values 340 to the code portions 164. The system 300 identifies those code portions 164 having weight values 340 above a threshold value 328 as potential insider threat candidates 326. The system 300 (by the batch processing engine 122) identifies coders 318 who authored those code portions 164 having weight values 340 above the threshold value 342. The system 300 determines whether each potential insider threat candidate 326 corresponds to a known pattern of insider threat 302. If it is determined that a potential insider threat candidate 326 corresponds to a known pattern of insider threat 302, the system 300 sends an applicable notification to a user to address it, for example, by issuing a code review, by eliminating those insider threats 302, identifying insiders and accomplices responsible for those insider threats 302, etc. If it is determined that a potential insider threat candidate 326 does not correspond to a known pattern of insider threat 302, the system 300 adjusts one or more rules used to configure the static analysis engine 124 and/or rules 334 used to design the automated analysis.

In one embodiment, system 300 and method 500 for determining insider threats 302 concealed or obfuscated in source code 112 as further use cases of identifying security vulnerabilities are described below with respect to FIGS. 3-5.

Examples of Insider Threats

In an example scenario, consider the coder 318-1 who is an employee of the organization A has written a first source code 112 for a software application A. The software application A works as intended within the organization A. Assume that the coder 318-1 hides in the first source code 112, a malicious code 330 which remains undetected and unexecuted until the software application A receives a rare input R which matches predefined rare input criteria. In response to receiving rare input R, software application A executes the malicious code 330. The malicious code 330 may thus be outside of mainline or mainstream of normal operation of the software application A (i.e. is purposefully layered, e.g. by hiding it within conditional statements e.g. "if statements" that get executed only if the rare input R is received by the software application A). Thus, the coder 318-1 has successfully hidden their malicious code 330 until a time when the rare input R is received by the software application A.

In another example scenario, assume that the software application A is further configured to obtain location coordinate data L of a location where the software application A is being used. the location coordinate data L can be, for example, a Global Positioning System (GPS) location coordinate of a computing device, e.g., computing device 102 on which the software application A is being used. For example, the GPS location coordinate of the computing device 102 may be determined from the IP address of the computing device 102.

For example, assume that when the software application A is installed on the computing device 102, the software application A obtains the location coordinate data L of the computing device 102. Upon determining that the location coordinate data L matches a predefined location coordinate data criteria (i.e., the location coordinate of the target of the insider threat 302), the software application A executes the malicious code 330. Thus, the coder 318-1 has successfully hidden their malicious code 330, such that it is executed when the software application A is being used at the target of the insider threat 302.

In another example scenario, the coder 318-1 desires to prevent their malicious code 330 from being traced back to him/her in an event that the malicious code 330 is detected. The coder 318-1, therefore, enlists another coder 318 (e.g., a trusted coder 318-2) to commit his/her malicious code 330 into production. The trusted coder 318-2 commits the malicious code 330 without knowing about the malicious code 330. Thus, the coder 318-1 has successfully prevented their malicious code 330 from being traced back to him/her if discovered.

In another example scenario, assume that the software application A uses a library file E that is external to the organization A. In order to hide his/her malicious code 330, the coder 318-1 contributes the malicious code 330 to the external library E and/or puts a place-holder in the external library E to be later replaced with the malicious code 330. For example, assume that the malicious code 330 in the external library E functions as normal code without receiving the rare input R to harvest or trigger the malicious code 330. The coder 318-1 may subsequently lobby for the external library E to be accepted for use at the organization A. As such, the external library E (and consequently the malicious code 330) may be used at the organization A and even go through version updates, even for years. Thus, the malicious code 330 in the external library E may remain undetected and on harvested or triggered upon the software application A receiving the rare input R that matches the input criteria predefined by the coder 318-1. Upon the software application A receiving the rare input R, the malicious code 330 is executed and, for example, data stored in a database is exfiltrated, destroyed, modified, etc. Thus, the coder 318-1 has successfully prevented their malicious code 330 from being traced back to him using external library E which was not developed within the organization and may have gone through generations of version updates. Moreover, the coder 318-1 has successfully hidden their malicious code 330 from being discovered by conventional code search tools and code analysis tastings by purposefully placing the malicious code 330 in a layered section of a code that is out of the scope of the normal functional operation of software application A. It may thus be appreciated that the malicious code 330 may remain undetected for long periods of time using conventional insider threat detection systems. The examples in this disclosure are used only for clarity of the description and are not meant to limit the scope of this disclosure. Additional data, operations, actions, tasks, activities, and manipulations are conceivable from this disclosure and the same are contemplated within the scope of the illustrative embodiments.

It is noted that a malicious coder 318 may employ a variety of obfuscation methods to conceal the insider threat 302 (and malicious code 330) in the source code 112. These obfuscation methods may conform to a general set of rules 334 known or expected to be used for obfuscating insider threats 302. By identifying the set of rules 334, particular source code 112 or a particular portion of the source code 112 containing the obfuscated malicious code 330 may be identified, e.g., at a time of insertion of the malicious code 330, layering of the malicious code 330, and/or harvesting of the malicious code 330.

In one embodiment, this is achieved by automatically and repeatedly executing automated analysis or search queries 322 (see the corresponding description of the automated analysis engine 312 below). Thus, code portions 164 suspected of containing the malicious code 330, the insider/suspect/ malicious coder 318, and his/her accomplices can be identified for further insider threat analysis as explained hereinafter.

In one embodiment, the set of rules 334 may include the following obfuscation methods: 1) utilizing a particular pattern of using trusted and ordinary parameters to trigger the malicious code 330, while other patterns of using of those trusted parameters are harmless. For example, assume that parameters A and B individually are harmless. Thus, malicious code 330 may be layered in one or more conditional statements, such that the malicious code 330 is triggered only when both parameters A and B are passed (or are logical True). In other words, concealing the malicious code 330 using ordinary and trusted parameters (e.g., A and B), such that nobody would suspect statements executed when all of those trusted parameters are passed (e.g., A+B=triggering the malicious code 330); 2) placing the malicious code 330 in a trusted tool (e.g., internal/enteral library file) or placing a place-holder in a trusted tool to be replaced with the malicious code 330 later. Thereby, obfuscating the malicious code 330 from being caught using code searching tools; 3) placing the malicious code 330 in a particular code portion 164 and contending that there are no malicious codes 330 in the particular code portion 164; 4) placing the malicious code 330 in a particular code portion 164 that is intended to perform ordinary functions, such as updating a database, thereby hiding the malicious code 330 in the particular code portion 164. For example, layering the malicious code 330 in a particular code portion 164 that performs an ordinary function as expected most of the time (e.g., 99.99% of the time), such that the layered malicious code 330 is executed only when the conditions of the layers used to conceal the malicious code 330 are satisfied; 5) getting another coder 318 to commit a particular code portion 164 containing the malicious code 330, thereby isolating from being associated with or traced from the particular code portion 164; 6) placing the malicious code 330 (or a place-holder to be later replaced with the malicious code 330) in a trusted code portion 164 (or a trusted library file), which performs a plurality of trusted functions. For example, placing the malicious code 330 in a trusted library or a framework that as a result of being trusted has gone through generations of version updates; and 7) placing the malicious code 330 in a particular code portion 164 and deceiving others that the particular code portion 164 does not contain any malicious code 330, thereby the particular code portion 164 is not suspected to be associated with insider threats 302. An example code portion 164 containing example malicious code 330 is illustrated in FIG. 4.

FIG. 4 illustrates a code portion 164 that includes an instance of malicious code 330a. As illustrated in FIG. 4, function foo takes input arguments arg1 and arg2. Function foo connects to a database with the name of database01 by executing line 3. Line 3 may include other parameters, such as the address and password of the database01. The arguments arg1 and arg2 may be ordinary arguments and used in other code portions 164 as well. For example, under normal scenarios function foo may be used to update the database01 when arg1 passes. In other words, arg1 frequently passes and "normal scenario" is executed almost all the time (e.g., above 99.99% of the time). However, in a rare scenario where both arg1 and arg2 pass, the malicious code 330a is executed, where the malicious code 330a is an instance of malicious code 330 of FIG. 3. In other words, the malicious code 330a is intentionally obfuscated because arg2 is inherited from arg1, and the malicious code 330a is camouflaged because the combination pattern of arg1 and arg2 passing is a rare condition that is entirely different and outside of the normal operation of function foo. For example, the "creatStatement" in line 10 may create a query statement that introduces a security vulnerability. For example, the statement created by the "creatStatement" in line 10 may be a query statement that when executed data from the database01 is exfiltrated, destroyed, modified, etc. In another example, the statement created by the "creatStatement" in line 10 may be a vulnerable or improper query statement which the insider may take advantage of, for example, by infiltrating/destroying/modifying the database01 by query injections. While the example code portion 164 of FIG. 4 includes one function with two arguments, it is understood that any number of arguments, layers, conditional statements, and patterns of conditional statements may be used to obfuscate malicious code 330a.

Identifying Insider Threats 302

Referring back to FIG. 3, for identifying insider threats 302 in source code 112, batch processing engine 122 digests the plurality of source code 112a in the centralized source code repositories 116 after a pre-processing batch update step of the plurality of source code 112, similar to as described in FIG. 1 with respect to identifying unpermitted data 114. As such, the batch processing engine 122 may label each source code 112a (or each code portion of the source code 112a) with its corresponding timestamps when it was accessed, checked-in, checked-out, etc. The batch processing engine 122 stores the indexed centralized source code 112a as indexed source code 118 in the temporary storage 162. Thus, the code portions 164 (and indexed source code 118) are query-searchable using their labels, similar to as described in FIG. 1.

In one embodiment, the batch processing engine 122 may also be configured to determine coding styles 320 used in the source code 118 or each code portion 164. In one embodiment, the batch processing engine 122 may use an NLP algorithm to dissect code lines from the code portions 164 and determine their code features, where each code feature is an instance of a coding style 320 related to coding practice. For example, the NLP algorithm may include any type of text analysis, such as word segmentation, sentence segmentation, word tokenization, sentence tokenization, and/or the like.

The coding style 320 used in a code portion 164 may be any data or fact inferred from that code portion 164. For example, the coding style 320 used in a particular code portion 164 may represent the coding behavior of its corresponding author (i.e., coder 318), such as consistency, frequency of use, casing, a choice pattern of words, a choice pattern of using functions, etc. As such, the batch processing engine 122 attributes the coding style 320 to its corresponding coder 318 based on the frequency of instances of the coding style 320 used by the coder 318. As such, the batch processing engine 122 may detect whether a particular code portion 164-1 is written by a particular coder 318-1 by comparing the coding style 320-1 (previously attributed to the coder 318-1) and a coding style 320 detected in the code portion 164-1. Thus, the batch processing engine 122 labels or indexes the code portion 164-1 with the coder 318-1, if it determines that the coding style 320-1 matches the coding style 320 detected in the code portion 164-1. As such, the coding styles 320 of coders 318 may be used to determine whether the coder 318-1 of the code portion 164-1 has committed the code portion 164-1 and also to identify the actual coder 318 of the code portion 164-1 even if it was committed by another coder 318, e.g., by comparing the coding style 320 used in the code portion 164-1 and the coding styles 320 of coders 318.

Automated Analysis Engine

The automated analysis engine 312 may be implemented by the processor 120 executing software instructions 132, and is configured to automatically and repeatedly execute one or more search queries 322 designed to detect different patterns of insider threats 302. The automated search queries 322 are executed to find code portions 164 that are expected to include different patterns of insider threats 302. For example, the automated search queries 322 may be a taxonomy of use cases for identifying different methods used to inject insider threats 302 (or malicious code 330). The automated analysis engine 312 executing the automated search queries 322 is herein referred to as automated analysis. The automated analysis is performed for synchronization and process coordination of the static analysis engine 124, composite analysis engine 314, and clustering module 316 (i.e., ensuring detecting accurate instances of insider threats 302 and that rules used to configure and tune these processes are not conflicting each other). The automated analysis is designed based on the set of rules 334 that specify known or expected to be used coding patterns to obfuscate insider threats 302 (or malicious code 330). As described above, the set of rules 334 specify different methods of code obfuscation, code smuggling, injecting malicious code 330, isolating from the injection of malicious code 330, etc.

The automated analysis is configured to be automatically and repeatedly executed to further refine the set of rules 334 in order to output more accurate results (i.e., more accurate instances of insider threats 302). For example, assume that the first search query 332 is executed. The first search query 332 may include statements that specify to search for code portions 164 that include patterns identified in the rules 334 and/or correspond to one or more rules 334. For example, the first search query 332 may include a statement that specifies to search for code portions 164 that include keywords 336 that are related to a set of known or expected instances of insider threats 302 and targets of insider threats 302, such as database credentials, server credentials, user credentials, etc. In another example, the first search query 332 may include a statement that specifies to search for code portions 164 that were checked-in through an account belonging to a coder 318 whose coding style 320 does not match the coding style 320 of the checked-in code portion 164 (i.e., searching for smuggled code portions 164). The results returned from repeatedly executing the first search query 332 are passed to the static analysis engine 124 for further insider threat analysis.

Performing Semantic, Data Flow, and Control Flow Analyses

The static analysis engine 124 uses the semantic analysis rules 306, data flow analysis rules 308, and control flow analysis rules 310 to perform the semantic analysis, data flow analysis, and control flow analysis, respectively.

The semantic analysis rules 306 may indicate to identify keywords 336 that are related to a set of known or expected instances of insider threats 302 and targets of insider threats 302, such as database credentials, server credentials, user credentials, etc. As such, the static analysis engine 124, using the semantic analysis, searches for the keywords 336 in the code portions 164. Referring to FIG. 4, the semantic analysis returns line 3 where the "DriverManager.getConnection" is used to connect to the database01. The static analysis engine 124 may also return all other instances where "DriverManager.getConnection" is used for establishing connections to databases, servers, or other entities.

Referring back to FIG. 3, the data flow analysis rules 308 may indicate to search for data paths where data is transferred from a code portions 164 to other code portions 164 (i.e., searching for external data with respect to a code portion 164). As such, the static analysis engine 124, using the data flow analysis, searches for locations where external data is used. Referring to FIG. 4, the data flow analysis returns function foo because it includes arg1 and arg2 that are external data with respect to the function foo. The data flow analysis may also return all other functions that include arg1 and arg2 to determine their transfer paths from where they are originated to where they are used.

Referring back to FIG. 3, the control flow analysis rules 310 may indicate to search for execution paths where a layering method is used to obfuscate a content (i.e., searching for non-mainline code where rare conditions are used that are out of the scope of operation of a code portion 164). Referring to FIG. 4, the control flow analysis returns lines 10 and 11 which include the malicious code 330a because the condition of arg1 and arg2 passing is a rare condition and out of the scope of operation of the example code portion 164 of FIG. 4. Referring back to FIG. 3, the results from the semantic analysis, data flow analysis, and control flow analysis are passed to the composite analysis engine 314 for further insider threat analysis.

Composite Analysis Engine

The composite analysis engine 314 may be implemented by the processor 120 executing software instructions 132, and is configured to group or "glue" the results from the semantic analysis, data flow analysis, and control flow analysis. In other words, the composite analysis engine 314 is configured to find points of correlations between the results (i.e., code portions 164) individually outputted from the semantic analysis, data flow analysis, and control flow analysis. In other words, the composite analysis engine 314 searches for relationships between these results. The composite analysis engine 314 then assigns weight values to the code portions 164 based on the number of points of correlations found between the results of the semantic analysis, data flow analysis, and control flow analysis. The weight value assigned to a code portion 164 corresponds to a probability of that code portion 164 containing an insider threat 302.

Referring to FIG. 4, the composite analysis engine 314 finds three points of correlations between the results from the semantic analysis, data flow analysis, and control flow analysis, which are: 1) the example code portion 164 of FIG. 4 is used to connect to a database (detected by the static analysis); 2) it includes external data (detected by the data flow analysis); and 3) it is a non-mainline code (detected by the control flow analysis). As such, the composite analysis engine 314 assigns a high weight value to the example code portion 164 of FIG. 4, e.g., 7 out of 10.

Referring back to FIG. 3, thus those code portions 164 that have higher weight values compared to other code portions 164 are boosted or ranked higher, indicating a higher probability that they correspond to intentional insider threats 302. The results from the composite analysis engine 314 are stored in the query result database 146 as the results 324.

Clustering Module

Clustering module 316 may be implemented by the processor 120 executing software instructions 132, and is configured to determine to which cluster 328 each code portion 164 identified in the results from the composite analysis engine 314 belongs. In one embodiment, the clustering module 316 may be implemented by the unsupervised machine learning algorithm 338, such as k-Means clustering, and/or any other clustering method.

In one embodiment, the clusters 328 are defined based on different patterns of committing insider threats 302. In one example, cluster 328-1 may indicate one or more particular patterns known or expected to be used to exfiltrate data. One example of a data exfiltration pattern includes: 1) injecting an event-triggered-based security vulnerability that occurs when a particular condition is met, e.g., reaching a particular location or receiving a particular input; 2) connecting to a database when the particular condition is met; and 3) transferring data from the database. As such, the clustering module 316 classifies those code portions 164 (identified in the results from the composite analysis engine 314) that correspond to the one or more particular patterns known or expected to be used to exfiltrate data into the cluster 328-1.

In another example, cluster 328-2 may indicate one or more particular patterns known or expected to be used to obfuscate data. For example, assume that a malicious coder 318 wishes to obfuscate the loss in revenue in an annual report. In this case, the malicious coder 318 may inject malicious code 330 in source code 118 whose function is to exclude those accounts associated with the loss. As such, one example of a data obfuscation pattern includes; 1) injecting a function that takes inputs that it is not supposed to; 2) modifying, by the function, data that is associated with the inputs; and 3) covering tracks, e.g., by layering the function, having someone else to commit the function, etc. Thus, the clustering module 316 classifies those code portions 164 (identified in the results from the composite analysis engine 314) that correspond to the one or more particular patterns known or expected to be used to conceal data into the cluster 328-2.

In another example, cluster 328-3 may indicate one or more particular patterns known or expected to be used to purposefully introduce security vulnerabilities. For example, assume that a coder 318-1 has been found responsible for using less than perfect coding methods and thus introducing security vulnerabilities, such as a vulnerability that allows unauthorized connections to a database. Also, assume that the coder 318-1 has been warned and trained to use proper connection functions that eliminate or reduce unauthorized connections to a database. However, the coder 318-1 is still introducing similar security vulnerabilities. Also, assume that the coder 318-1 is using obfuscation methods to hide those security vulnerabilities (e.g., by layering), attempts to hide his/her tracks (e.g., by getting someone else to commit his/her code). In this case, it is more likely that the coder 318-1 is an insider. As such, one example of a pattern for purposefully introducing security vulnerabilities include: 1) using less than perfect coding methods: 2) consistently repeating similar less than perfect coding methods even after being warned; and 3) covering tracks, by layering, having someone else to commit his/her code, etc. Thus, the clustering module 316 classifies those code portions 164 (identified in the results from the composite analysis engine 314) that correspond to the one or more particular patterns known or expected to be used to introduce security vulnerabilities into cluster 328-3. Other examples of clusters 328 include but are not limited to malicious destruction, alteration, modification, and injection of data.

The clusters 328 of classified code portions 164 that correspond to different patterns of committing insider threats 302 are identified in the results 324. The associations between the code portions 164 and coders 318 are determined by the batch processing engine 122, as described above. As discussed above, the code portions 164 identified by the results from the composite analysis engine 314 are ranked based on their weight values corresponding to the number of points of correlations between the results from the semantic analysis, data flow analysis, and control flow analysis. In one embodiment, the code portions 164 identified in the results 324 having a weight value above a threshold value 342 (e.g., above 7 out of 10) are referred to as potential insider threat candidates 326.

The clustering module 316 is also configured to determine whether the code portions 164 identified in the results 324 contain insider threats 302.

For example, the clustering module 316 may use NLP techniques to extract features of the potential insider threat candidates 326 and the insider threats 302. The clustering module 316 may then compare the features of the potential insider threat candidates 326 with the features of the insider threats 302. If the features of a potential insider threat candidate 326 match (above a threshold percentage, e.g., 80%) the features of the insider threats 302, it is determined that the potential insider threat candidate 326 is an instance of the insider threats 302, i.e., the prediction that the potential insider threat candidate 32 is an instance of the insider threats 302 is true-positive or valid. If the features of the potential insider threat candidate 32 do not match (or match below a threshold percentage, e.g., 80% of) the features of the insider threats 302, it is determined that the potential insider threat candidate 326 is not an instance of the insider threats 302, i.e., the prediction that the potential insider threat candidate 326 being an instance of insider threats 302 is false-positive or not valid.

In another example, the clustering module 316 compares each potential insider threat candidate 326 with a set of known insider threats 302. For example, the clustering module 316 compares the pattern of the potential insider threat candidate 326 with the patterns of the set of known insider threats 302. If it is determined that a potential insider threat candidate 326 is not among the set of known insider threats 302, it is concluded that predicting the potential insider threat candidate 326 being an instance of insider threats 302 is a false-positive (i.e., not valid).

In such cases, feedback from the clustering module 316 is used to tune or adjust one or more of the semantic analysis rules 306, data flow analysis rules 308, and control flow analysis rules 310 to produce more accurate results 324 (i.e., more accurate potential insider threat candidates 326). If it is determined that the potential insider threat candidate 326 is an instance of insider threats 302 or among the set of known insider threats 302, it may be addressed, for example, by removing it, issuing a code review for other code portions 164 authored by the coder 318 of the potential insider threat candidate 326, etc.

In another example, the validity of potential insider threat candidate 32 being an insider threat 302 (predicted by the clustering module 316) may be subsequently confirmed (or updated), for example, by a developer.

Example Method for Detecting Insider Threats in Source Code

Figure 5:
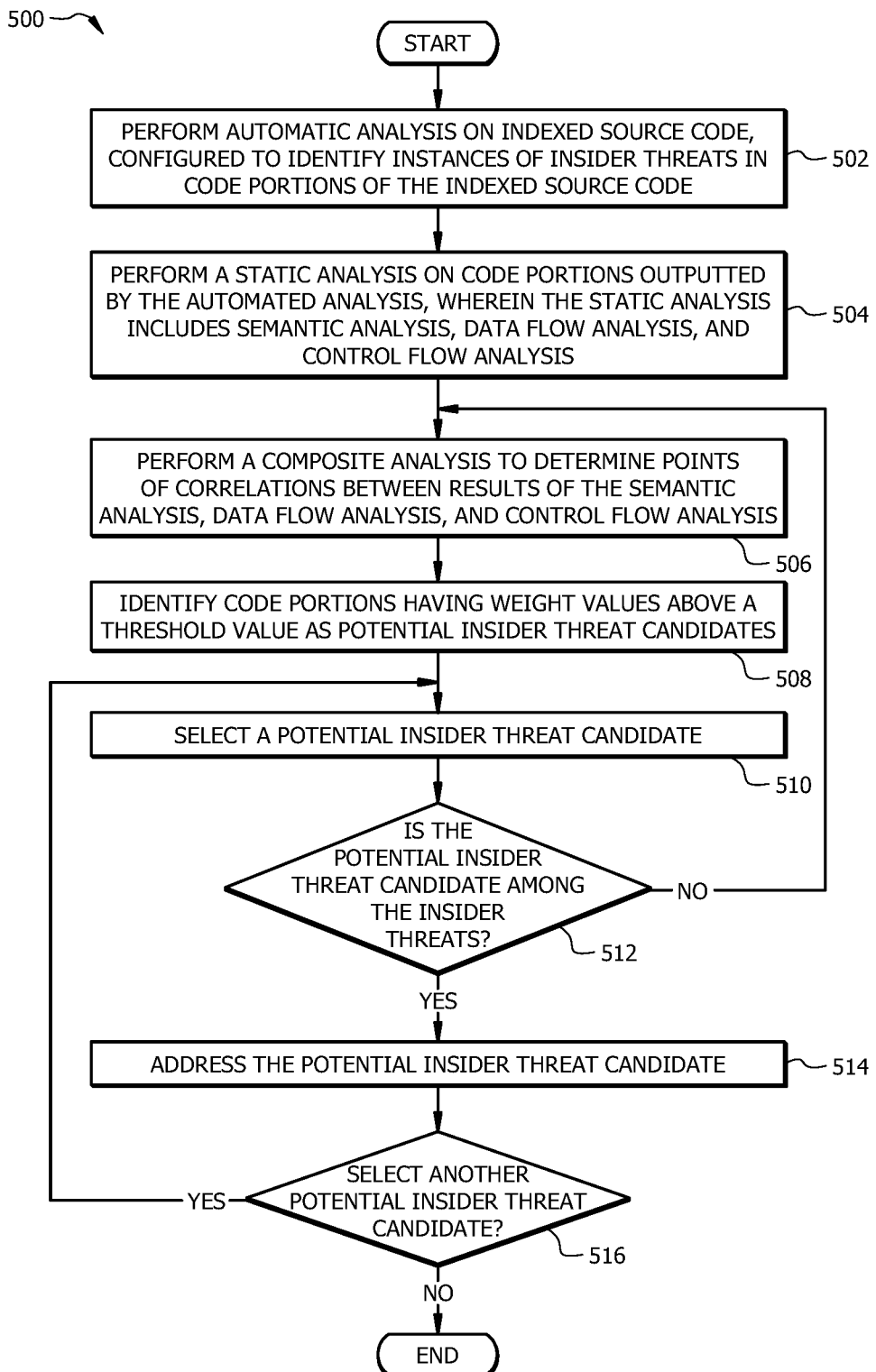
FIG. 5 illustrates an example of a flow chart of a method for identifying insider threats in source code.

FIG. 5 illustrates a flow chart of a method 500 for detecting insider threats 302 in source code 118. One or more of steps 502-514 of the method 500 may be implemented, at least in part, in the form of software instructions 132 stored on non-transitory, tangible, machine-readable media (e.g., memory 130) that when run by one or more processors (e.g., processor 120) may cause the one or more processors to perform steps 502-514. In some embodiments, method 500 may be performed on system 300 of FIG. 3, including the computing device 102, processor 120, and memory 130. Aspects of the steps 502-514 of the method 500 have been covered in the description for FIGS. 3 and 4; and additional aspects are provided below.

The method 500 begins at step 502 where automated analysis engine 312 performs the automated analysis (by executing automated search queries 322) on the code portions 164, where the automated analysis is configured to identify instances of insider threats 302 in the code portions 164. In this process, the automated analysis engine 312 performs the automated analysis by repeatedly and automatically querying the code portions 164 to identify an initial set of code portions 164 for further insider threat analysis, where the initial set of code portions 164 are identified based on the rules 334, as described in FIG. 3.

For example, the rules 334 may specify various obfuscation methods known or expected to be used for obfuscating insider threat 302 (or malicious code 330). The rules 334 may also specify scenarios where insider information may be useful, for example, to determine instances where an insider had someone else to check-in his/her malicious code 330 (i.e., instances of smuggling of malicious code 330). For instance, the rules 334 may specify instruction to determine whether a coding style 320 of a code portion 164-1 checked-in from an account associated with a coder 318-1 matches the coding style 320-1 of the coder 318-1. If the coding style 320 of the code portion 164-1 does not match the coding style 320-1, it is determined that the code portion 164-1 is smuggled and potentially contains malicious code 330.

The automated search queries 322 may be configured to capture code portions 164 corresponding to one or more obfuscation methods from rules 334, e.g., at a timestamp of committing of a code portion 164, at a timestamp of obfuscating the malicious code 330 (e.g., layering), or at a timestamp of use (or harvesting) of the malicious code 330. The automated search queries 322 may also be configured to automatically identify coders 318 who performed these actions and/or their accomplices, such as their team members, as described in FIG. 3.

In step 504, the static analysis engine 124 performs static analysis on the code portions 164 outputted from the automated analysis, where the static analysis includes the semantic analysis, data flow analysis, and control flow analysis.

The semantic analysis, data flow analysis, and control flow analysis are configured or tuned based on the semantic analysis rules 306, data flow analysis rules 308, and control flow analysis rules 310, respectively, as described in FIG. 3. The semantic analysis rules 306, data flow analysis rules 308, and control flow analysis rules 310 may be noted as a second set of rules as supposed to the first set of rules 334 used in the automated analysis. By performing the static analysis (using the second set of rules), a subset of initial set of code portions 164 (identified by the automated analysis) is chosen that is more likely to contain potential insider threats 302, as defined by the second set of rules, as described in FIG. 3.

In step 506, the composite analysis engine 314 determines points of correlations between the results of the semantic analysis, data flow analysis, and control flow analysis. In this process, the composite analysis engine 314 searches for relationships between the results of these analyses identified above. The composite analysis engine 314 then assigns a weight value 340 to each code portion 164 outputted from the static analysis engine 124. The weight value assigned to a code portion 164 corresponds to a probability of that code portion 164 containing an insider threat 302.

In step 508, the clustering module 316 identifies code portions 164 having weight values above the threshold value 328 as potential insider threat candidates 326.

In step 510, the clustering module 316 selects one of the potential insider threat candidates 326. The clustering module 316 iteratively selects a potential insider threat candidate 326 until no more potential insider threat candidate 326 is left.

In step 512, the clustering module 316 determines whether the potential insider threat candidate 326 is among the insider threats 302.

For example, the clustering module 316 may determine that the potential insider threat candidate 326 is among the insider threats 302 by extracting and comparing features of the potential insider threat candidate 326 with the features of the insider threats 302.

For example, the clustering module 316 may use NLP techniques to extract features of the potential insider threat candidate 326 and the insider threats 302. As such, the clustering module 316 predicts whether the selected potential insider threat candidate 326 can be classified with any of the insider threats 302.

If it is determined that the selected potential insider threat candidate 326 can be classified with any of the insider threats 302 (i.e., it is among the insider threats 302), the method 500 proceeds to step 512. If it is determined that potential insider threat candidate 326 cannot be classified with any of the insider threats 302 (i.e., it is not among the insider threats 302), the method 500 returns to step 506. In other words, predicting that the selected potential insider threat candidate 326 is as an instance of insider threats 302 is a false-positive (i.e., not valid). In this case, one or more of the semantic analysis rules 306, data flow analysis rules 308, and control flow analysis rules 310 are adjusted or tuned to produce more accurate results 324 (i.e., more accurate potential insider threat candidates 326). In another example, the clustering module 316 determines whether the selected potential insider threat candidate 326 is among the insider threats 302 by extracting and comparing features of the potential insider threat candidate 326 with features of a set of known insider threats 302. In another example, the prediction from the clustering module 316 may be validated (or updated) by a developer.

In step 514, the insider threat 302 is addressed, for example, by removing it, issuing a code review for other code portions 164 authored by the coder 318 of the potential insider threat candidate 326, etc.

In step 516, the clustering module 316 determines whether to select another potential insider threat candidate 326. The clustering module 316 selects another potential insider threat candidate 326 if there is at least one potential insider threat candidate 326 is left for evaluation. Otherwise, the method 500 terminates.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated into another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U. S.C. § 112(f) as it exists on the date of filing hereof unless the words "means for" or "step for" are explicitly used in the particular claim.

The invention claimed is:

1. A system for identifying unpermitted data in source code, comprises:
 a memory operable to store source code comprising a plurality of code portions; and
 a processor communicatively coupled to the memory, configured to:
  label each code portion of the source code with one or more vulnerability factors that indicate a security vulnerability associated with that code portion;
  label each code portion with a category of each vulnerability factor from the one or more vulnerability factors, wherein the category of each vulnerability factor provides information about the security vulnerability associated with that code portion with respect to that vulnerability factor;

receive a search query from a user to detect unpermitted data in the source code, wherein:
  the unpermitted data comprises at least one of an unsecured data and a defective code portion; and
  the search query comprises a particular keyword which includes the unpermitted data and at least one of the vulnerability factors;
for each code portion from the plurality of code portions of the source code:
  perform a static analysis on the code portion, wherein the static analysis comprises identifying one or more instances of the particular keyword in the code portion;
  in response to identifying one or more instances of the particular keyword in the code portion, perform a vulnerability analysis on the code portion to determine a vulnerability level for the code portion by:
    determining a factor weight for each vulnerability factor based at least in part upon a contribution that each vulnerability factor has on the vulnerability level for the code portion;
    determining a category weight for the category of each vulnerability factor based at least in part upon a contribution that each category has on the vulnerability level for a corresponding code portion, wherein the vulnerability level associated with the code portion corresponds to a potential severity of exposure of the code portion if the code portion comprised the unpermitted data; and
  determine a score value of the code portion by calculating a weighted sum of one or more factor weights and their corresponding one or more category weights;
identify code portions having score values above a threshold value as potential unpermitted data candidates;
for each of the potential unpermitted data candidates:
  determine whether the potential unpermitted data candidate is among the unpermitted data by comparing the potential unpermitted data candidate with a set of known unpermitted data; and
  in response to a determination that the potential unpermitted data candidate is not among the set of known unpermitted data, adjust the one or more factor weights and the one or more category weights in the vulnerability analysis.

2. The system of claim 1, wherein the processor is further configured to in response to a determination that the potential unpermitted data candidate is among the set of known unpermitted data, send an applicable notification to the user to address the potential unpermitted data candidate.

3. The system of claim 1, wherein performing the static analysis on the code portion comprises:
  determining whether the code portion comprises the particular keyword associated with the unpermitted data by searching for the particular keyword in the code portion;
  in response to determining that the code portion comprises the particular keyword, determining one or more locations where the code portion is used by tracking the code portion in a data flow and a control flow of the source code, wherein:
    the data flow of the source code comprises a transfer path of the code portion from a source of the code portion to one or more locations where the code portion is used; and
    the control flow of the source code comprises an execution path of the code portion.

4. The system of claim 1, wherein:
  a category of a file type factor indicates a format in which a code portion is stored;
  a category of a security mechanism factor indicates a type of security mechanism used in a code portion;
  a category of a credential type factor indicates a privilege level associated with a code portion;
  a category of a timestamp factor indicates particular time intervals that each user has accessed a code portion; and
  a category of an affinity profile factor indicates an affinity level of each user who has accessed a code portion at particular time intervals.

5. The system of claim 1, wherein adjusting one or more factor weights and one or more category weights is performed by a machine learning algorithm; and
  determining whether the potential unpermitted data candidate is among the unpermitted data by comparing the potential unpermitted data candidate with the set of known unpermitted data comprises:
    comparing one or more vulnerability factors and a category of each vulnerability factor of the set of known unpermitted data with their corresponding vulnerability factor and a category of each vulnerability factor of the potential unpermitted data candidate, respectively;
    determining whether the one or more vulnerability factors and categories of the potential unpermitted data candidate match above a configurable threshold number of the one or more vulnerability factors and categories of at least one known unpermitted data;
    in response to determining that the one or more vulnerability factors and categories of the potential unpermitted data candidate, respectively, match above the configurable threshold number of the one or more vulnerability factors and categories of at least one known unpermitted data; determine that the potential unpermitted data candidate is among the unpermitted data; and
    in response to determining that the one or more vulnerability factors and categories associated with the potential unpermitted data candidate, respectively, does not match above the configurable threshold number of the one or more vulnerability factors and categories associated with any of the known unpermitted data; determine that the potential unpermitted data candidate is not among the unpermitted data.

6. The system of claim 1, wherein the processor is further configured to perform an ad-hoc analysis, comprising:
  determining a set of abstract rules for performing a particular operation on the unpermitted data, such that the set of abstract rules for performing the particular operation is the same in different programming languages, wherein the particular operation causes exposure of the unpermitted data;
  searching for any of the set of abstract rules throughout the source code;
  in response to finding one or more code portions that include any of the set of abstract rules used to perform the particular operation on the unpermitted data:

determine that the one or more code portions include the unpermitted data; and increase one or more of factor weights and category weights of the one or more code portions.

7. The system of claim 1, wherein the processor is further configured to:
   identify a particular pattern of using the unpermitted data in different programming languages;
   identify steps of a process flow of using the unpermitted data in the particular pattern used in different programming languages; and
   extract code portions which include at least one step from the steps of the process flow of using the unpermitted data in the particular pattern.

8. A method for identifying unpermitted data in source code, comprises:
   labeling each code portion of source code with one or more vulnerability factors that indicate a security vulnerability associated with that code portion;
   labeling each code portion with a category of each vulnerability factor from the one or more vulnerability factors, wherein the category of each vulnerability factor provides information about the security vulnerability associated with that code portion with respect to that vulnerability factor;
   receiving a search query from a user to detect unpermitted data in the source code, wherein:
      the unpermitted data comprises at least one of an unsecured data and a defective code portion; and
      the search query comprises a particular keyword which includes the unpermitted data and at least one of the vulnerability factors;
   for each code portion of the source code:
      performing a static analysis on the code portion, wherein the static analysis comprises identifying one or more instances of the particular keyword in the code portion;
      in response to identifying one or more instances of the particular keyword in the code portion, performing a vulnerability analysis on the code portion to determine a vulnerability level for the code portion by:
         determining a factor weight for each vulnerability factor based at least in part upon a contribution that each vulnerability factor has on the vulnerability level for the code portion;
         determining a category weight for the category of each vulnerability factor based at least in part upon a contribution that each category has on the vulnerability level for a corresponding code portion, wherein the vulnerability level associated with the code portion corresponds to a potential severity of exposure of the code portion if the code portion comprised the unpermitted data; and
         determining a score value of the code portion by calculating a weighted sum of one or more factor weights and their corresponding one or more category weights;
      identifying code portions having score values above a threshold value as potential unpermitted data candidates;
      for each of the potential unpermitted data candidates:
         determining whether the potential unpermitted data candidate is among the unpermitted data by comparing the potential unpermitted data candidate with a set of known unpermitted data; and
         in response to determining that the potential unpermitted data candidate is not among set of the known unpermitted data, adjusting the one or more factor weights and the one or more category weights in the vulnerability analysis.

9. The method of claim 8, wherein the method further comprises in response to determining that the potential unpermitted data candidate is among the set of known unpermitted data, sending an applicable notification to the user to address the potential unpermitted data candidate.

10. The method of claim 8, wherein performing the static analysis on the code portion comprises:
   determining whether the code portion comprises the particular keyword associated with the unpermitted data by searching for the particular keyword in the code portion;
   in response to determining that the code portion comprises the particular keyword, determining one or more locations where the code portion is used by tracking the code portion in a data flow and a control flow of the source code, wherein:
      the data flow of the source code comprises a transfer path of the code portion from a source of the code portion to one or more locations where the code portion is used; and
      the control flow of the source code comprises an execution path of the code portion.

11. The method of claim 8, wherein
   a category of a file type factor indicates a format in which a code portion is stored;
   a category of a security mechanism factor indicates a type of security mechanism used in a code portion;
   a category of a credential type factor indicates a privilege level associated with a code portion;
   a category of a timestamp factor indicates particular time intervals that each user has accessed a code portion; and
   a category of an affinity profile factor indicates an affinity level of each user who has accessed a code portion at particular time intervals.

12. The method of claim 8, wherein determining whether the potential unpermitted data candidate is among the unpermitted data by comparing the potential unpermitted data candidate with the set of known unpermitted data comprises:
   comparing one or more vulnerability factors and a category of each vulnerability factor of the set of known unpermitted data with their corresponding vulnerability factor and a category of each vulnerability factor of the potential unpermitted data candidate, respectively;
   determining whether the one or more vulnerability factors and categories of the potential unpermitted data candidate match above a configurable threshold number of the one or more vulnerability factors and categories of at least one known unpermitted data;
   in response to determining that the one or more vulnerability factors and categories of the potential unpermitted data candidate, respectively, match above the configurable threshold number of the one or more vulnerability factors and categories of at least one known unpermitted data; determine that the potential unpermitted data candidate is among the unpermitted data; and
   in response to determining that the one or more vulnerability factors and categories associated with the potential unpermitted data candidate, respectively, does not match above the configurable threshold number of the one or more vulnerability factors and categories associated with any of the known unpermitted data; determine that the potential unpermitted data candidate is not among the unpermitted data.

13. The method of claim 8, wherein the method further comprises:
   determining a set of abstract rules for performing a particular operation on the unpermitted data, such that the set of abstract rules for performing the particular operation is the same in different programming languages, wherein the particular operation causes exposure of the unpermitted data;
   searching for any of the set of abstract rules throughout the source code;
   in response to finding one or more code portions that include any of the set of abstract rules used to perform the particular operation on the unpermitted data:
   determine that the one or more code portions include the unpermitted data; and
   increase one or more of factor weights and category weights of the one or more code portions.

14. The method of claim 8, wherein the method further comprises:
   identify a particular pattern of using the unpermitted data in different programming languages;
   identify steps of a process flow of using the unpermitted data in the particular pattern used in different programming languages; and
   extract code portions which include at least one step from the steps of the process flow of using the unpermitted data in the particular pattern.

15. A computer program comprising executable instructions stored in a non-transitory computer-readable medium that when executed by a processor causes the processor to:
   label each code portion of source code with one or more vulnerability factors that indicate a security vulnerability associated with that code portion;
   label each code portion with a category of each vulnerability factor from the one or more vulnerability factors, wherein the category of each vulnerability factor provides information about the security vulnerability associated with that code portion with respect to that vulnerability factor;
   receive a search query from a user to detect unpermitted data in the source code, wherein:
      the unpermitted data comprises at least one of an unsecured data and a defective code portion; and
      the search query comprises a particular keyword which includes the unpermitted data and at least one of the vulnerability factors;
   for each code portion of the source code:
      perform a static analysis on the code portion, wherein the static analysis comprises identifying one or more instances of the particular keyword in the code portion;
      in response to identifying one or more instances of the particular keyword in the code portion, perform a vulnerability analysis on the code portion to determine a vulnerability level for the code portion by:
         determining a factor weight for each vulnerability factor based at least in part upon a contribution that each vulnerability factor has on the vulnerability level for the code portion;
         determining a category weight for the category of each vulnerability factor based at least in part upon a contribution that each category has on the vulnerability level for a corresponding code portion, wherein the vulnerability level associated with the code portion corresponds to a potential severity of exposure of the code portion if the code portion comprised the unpermitted data; and
         determine a score value of the code portion by calculating a weighted sum of one or more factor weights and their corresponding one or more category weights;
      identify code portions having score values above a threshold value as potential unpermitted data candidates;
      for each of the potential unpermitted data candidates:
         determine whether the potential unpermitted data candidate is among the unpermitted data by comparing the potential unpermitted data candidate with a set of known unpermitted data; and
         in response to a determination that the potential unpermitted data candidate is not among the set of known unpermitted data, adjust the one or more factor weights and the one or more category weights in the vulnerability analysis.

16. The computer program of claim 15, wherein the processor is further configured to in response to a determination that the potential unpermitted data candidate is among the set of known unpermitted data, send an applicable notification to the user to address the potential unpermitted data candidate.

17. The computer program of claim 16, wherein determining whether the potential unpermitted data candidate is among the unpermitted data by comparing the potential unpermitted data candidate with the set of known unpermitted data comprises:
   comparing one or more vulnerability factors and a category of each vulnerability factor of the set of known unpermitted data with their corresponding vulnerability factor and a category of each vulnerability factor of the potential unpermitted data candidate, respectively;
   determining whether the one or more vulnerability factors and categories of the potential unpermitted data candidate match above a configurable threshold number of the one or more vulnerability factors and categories of at least one known unpermitted data;
   in response to determining that the one or more vulnerability factors and categories of the potential unpermitted data candidate, respectively, match above the configurable threshold number of the one or more vulnerability factors and categories of at least one known unpermitted data; determine that the potential unpermitted data candidate is among the unpermitted data; and
   in response to determining that the one or more vulnerability factors and categories associated with the potential unpermitted data candidate, respectively, does not match above the configurable threshold number of the one or more vulnerability factors and categories associated with any of the known unpermitted data; determine that the potential unpermitted data candidate is not among the unpermitted data.

18. The computer program of claim 15, wherein performing the static analysis on the code portion comprises:
   determining whether the code portion comprises the particular keyword associated with the unpermitted data by searching for the particular keyword in the code portion;
   in response to determining that the code portion comprises the particular keyword, determining one or more locations where the code portion is used by tracking the code portion in a data flow and a control flow of the source code, wherein:

the data flow of the source code comprises a transfer path of the code portion from a source of the code portion to one or more locations where the code portion is used; and the control flow of the source code comprises an execution path of the code portion.

19. The computer program of claim 15, wherein:

a category of a file type factor indicates a format in which a code portion is stored;

a category of a security mechanism factor indicates a type of the security mechanism used in a code portion;

a category of a credential type factor indicates a privilege level associated with a code portion;

a category of a timestamp factor indicates particular time intervals that each user has accessed a code portion; and a category of an affinity profile factor indicates an affinity level of each user who has accessed a code portion at particular time intervals.

20. The computer program of claim 15, wherein the processor is further configured to perform an ad-hoc analysis, comprising:

determining a set of abstract rules for performing a particular operation on the unpermitted data, such that the set of abstract rules for performing the particular operation is the same in different programming languages, wherein the particular operation causes exposure of the unpermitted data;

searching for any of the set of abstract rules throughout the source code;

in response to finding one or more code portions that include any of the set of abstract rules used to perform the particular operation on the unpermitted data:

determine that the one or more code portions include the unpermitted data; and increase one or more of factor weights and category weights of the one or more code portions.

* * * * *